(12) United States Patent
Barnham

(10) Patent No.: US 8,517,045 B2
(45) Date of Patent: Aug. 27, 2013

(54) AUTOMATIC FLUID FLOW CONTROL DEVICE

(75) Inventor: James Wesley Barnham, London (GB)

(73) Assignee: About Time Design Limited, Bishop's Stortford (GB)

( * ) Notice: Subject to any disclaimer, the term of this patent is extended or adjusted under 35 U.S.C. 154(b) by 298 days.

(21) Appl. No.: 12/934,687

(22) PCT Filed: Mar. 27, 2009

(86) PCT No.: PCT/GB2009/000824
§ 371 (c)(1),
(2), (4) Date: Sep. 27, 2010

(87) PCT Pub. No.: WO2009/118537
PCT Pub. Date: Oct. 1, 2009

(65) Prior Publication Data
US 2011/0017928 A1    Jan. 27, 2011

(30) Foreign Application Priority Data

Mar. 27, 2008 (GB) .................................. 0805575.8
May 12, 2008 (GB) .................................. 0808543.3
Mar. 27, 2009 (GB) .................................. 0905300.0

(51) Int. Cl.
*F16K 31/08* (2006.01)

(52) U.S. Cl.
USPC ............... 137/315.33; 137/315.16; 137/430; 137/448; 137/595; 251/65

(58) Field of Classification Search
USPC ............... 137/315.33, 315.08, 411, 429, 430, 137/448, 315.16, 595; 251/65
See application file for complete search history.

(56) References Cited

U.S. PATENT DOCUMENTS

| RE18,520 E | 7/1932 | Mock |
| 2,752,936 A | 7/1956 | Cantalupo |
| 2,756,766 A | 7/1956 | Tronic |
| 2,871,873 A | 2/1959 | Mcqueen |
| 2,999,509 A | 9/1961 | Hankison et al. |
| 3,029,786 A | 4/1962 | Gillette et al. |
| 3,105,512 A | 10/1963 | Lyall et al. |
| 3,212,751 A | 10/1965 | Hassa |

(Continued)

FOREIGN PATENT DOCUMENTS

| CN | 2618011 Y | 5/2004 |
| DE | 2258634 A1 | 6/1972 |

(Continued)

OTHER PUBLICATIONS

English (machine) translation of CN2618011Y, May 26, 2004.

*Primary Examiner* — Kevin Lee

(57) ABSTRACT

One embodiment relates to an automatic fluid flow control device 1 for a fluid supply, the device comprising: an actuator 41 that carries or includes a magnet 43, the actuator being movable within a housing 3 from a first position corresponding to a normal fluid supply to a second position corresponding to a fluid oversupply, wherein the actuator 41 is removable from the housing 3 to enable the device to be cleaned, and the housing and actuator are configured so that the actuator can only be accommodated in the housing in an orientation that enables the magnet to exert a magnetic force to close a valve in the fluid supply as the actuator moves from the first to the second position.

18 Claims, 13 Drawing Sheets

(56) References Cited

U.S. PATENT DOCUMENTS

| | | | |
|---|---|---|---|
| 3,609,425 A | 9/1971 | Sheridan | |
| 3,891,000 A | 6/1975 | Melnick | |
| 3,905,391 A | 9/1975 | Oakes | |
| 3,980,457 A | 9/1976 | Smith | |
| 3,993,090 A | 11/1976 | Hankison | |
| 4,079,743 A | 3/1978 | Weston | |
| 4,531,544 A | 7/1985 | Jacobs | |
| 4,574,829 A | 3/1986 | Cummings | |
| 4,577,657 A | 3/1986 | Alexander | |
| 5,004,004 A | 4/1991 | Cummings | |
| 5,080,126 A | 1/1992 | De Rycke et al. | |
| 5,209,454 A | 5/1993 | Engdahl et al. | |
| 5,485,866 A | 1/1996 | Bowen | |
| 5,983,919 A | 11/1999 | Ottinger et al. | |
| 6,089,258 A * | 7/2000 | Busick et al. | 137/448 |
| 6,129,836 A | 10/2000 | Grayson | |
| 6,473,928 B1 | 11/2002 | Veloskey et al. | |
| 6,732,388 B2 | 5/2004 | McKenna | |
| 8,033,291 B2 * | 10/2011 | Randolph | 137/429 |
| 8,215,335 B2 * | 7/2012 | Barnham | 137/448 |
| 2004/0050424 A1 | 3/2004 | Sosa | |

FOREIGN PATENT DOCUMENTS

| | | |
|---|---|---|
| GB | 2 288 330 A | 10/1995 |
| GB | 2 373 859 A | 10/2002 |
| GB | 2 380 796 A | 4/2003 |
| GB | 2 407 033 A | 4/2005 |
| GB | 2 416 119 A | 1/2006 |
| GB | 2 421 558 A | 6/2006 |
| WO | WO-00/12922 A1 | 3/2000 |
| WO | WO 02/092923 A1 | 11/2002 |

\* cited by examiner

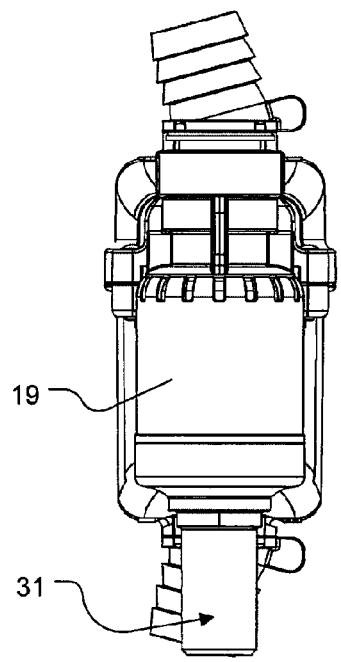
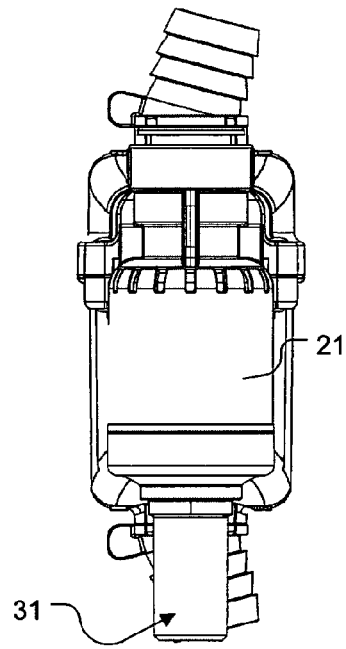
Fig. 4      Fig. 5
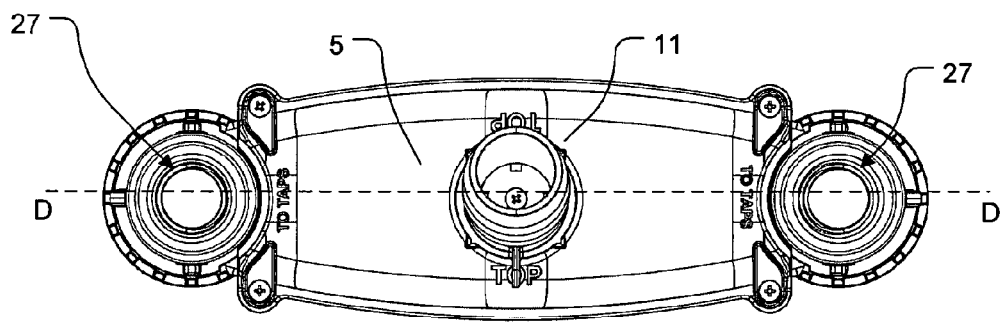
Fig. 6
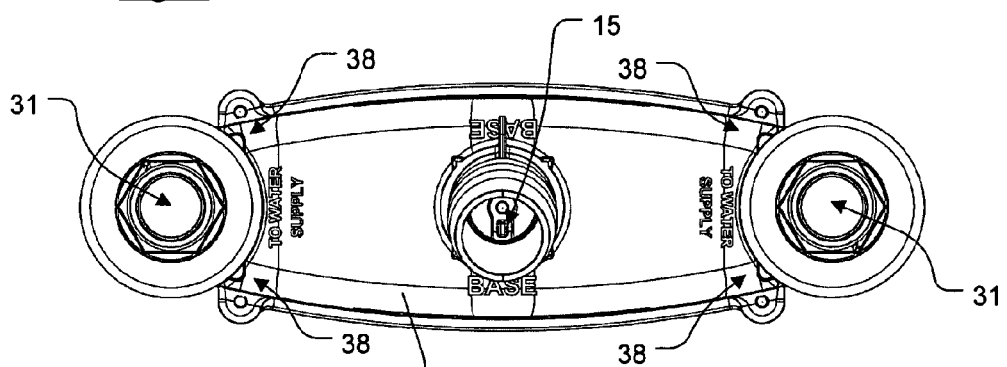
Fig. 7

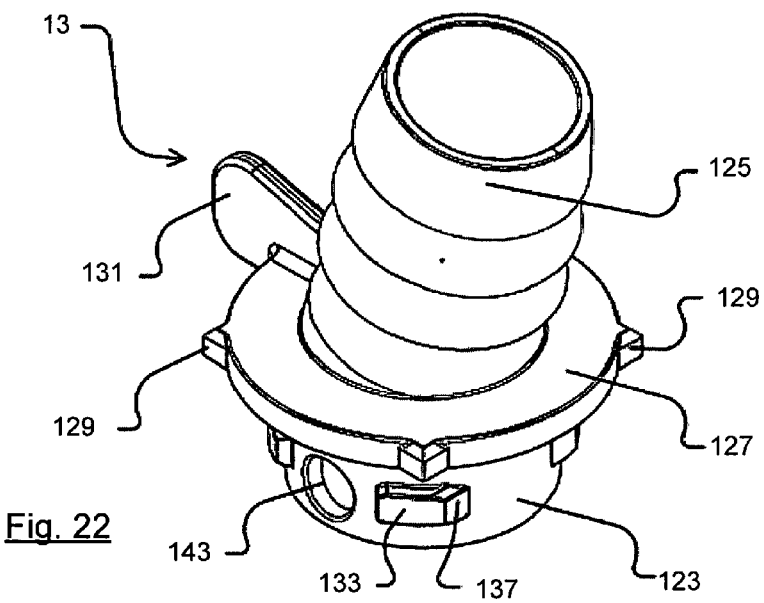
Fig. 22
Fig. 23
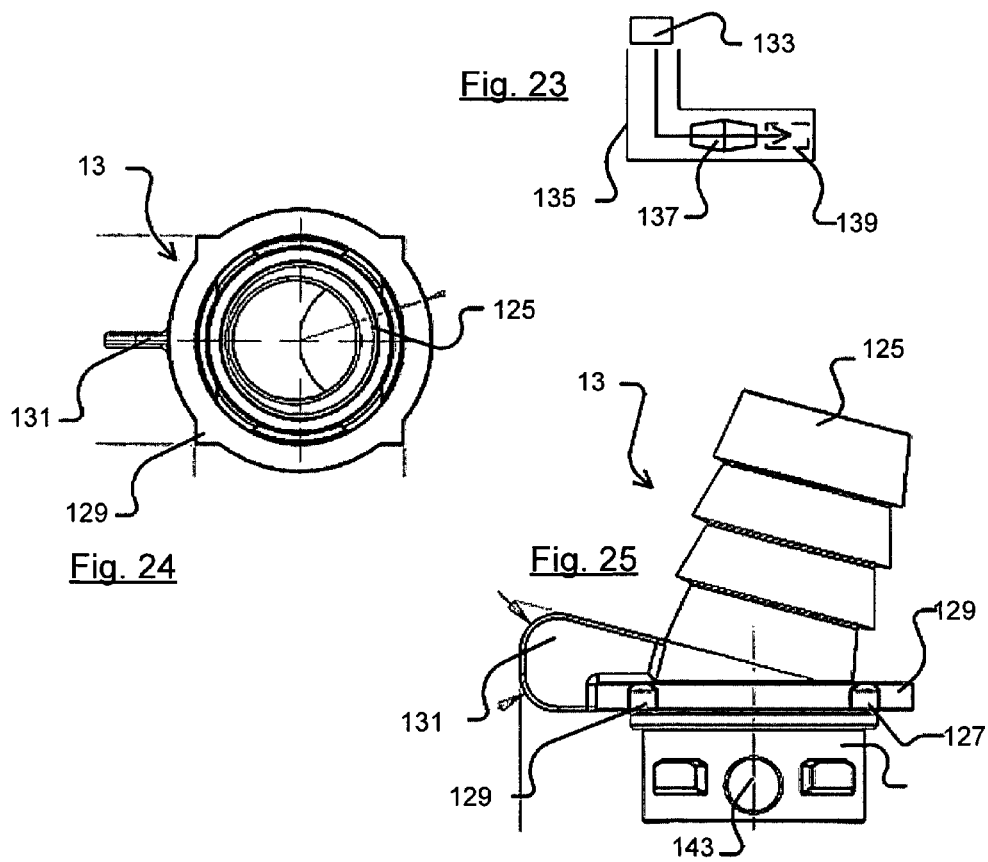
Fig. 24
Fig. 25

AUTOMATIC FLUID FLOW CONTROL DEVICE

FIELD OF THE INVENTION

The present invention relates to automatic fluid flow control devices, particularly but not exclusively to automatic liquid flow control devices. Particularly preferred embodiments of the present invention relate to automatic fluid flow control devices that are configured to operate when an oversupply condition occurs, and in one particularly preferred embodiment the device is operable to substantially shut-off (i.e. at least severely restrict) fluid flow until the device is reset.

Presently preferred embodiments of the present invention, and indeed the problems addressed by the present invention, are described hereafter with particular reference to domestic water-supply applications, but it should be noted that the scope of the present invention is not limited to a particular fluid type nor is it limited to a particular application. As such the following description should only be interpreted as being illustrative and should not be interpreted as limiting the scope of the present invention.

The device to be described can, for example, be used in domestic, commercial and industrial applications for the control of a variety of different fluids, including both gases and liquids.

BACKGROUND

In general terms, this application deals with improvements to automatic fluid flow control devices of the general type described in our earlier UK Patent GB2428800, and reference should be made to our earlier patent for a detailed description of the manner in which devices of this type operate.

Our previous UK patent GB2428800, the entire contents of which are also incorporated herein by reference, disclosed an automatic fluid flow control device in which an actuator and a valve magnetically interact to control the flow of fluid to an appliance such as, for example, a bathtub or sink.

Whilst the device disclosed in our prior patent operates flawlessly and has been extremely well received in the marketplace, our programme for continuous improvement has identified facets of that device which could be further improved.

For example, it is known that some bath users like to use products known colloquially as "bath bombs" which dissolve in the bath to scent and/or colour the water. Some of these bath bombs include solid matter such as flower petals, leaves or confetti as well as perfume and essential oils, and as this solid matter tends to float on the surface of the water in a bath it can be drawn, in the event of an overflow, inside a fluid flow control device of the type we have previously proposed.

We had anticipated that this might occur, and had included in our previously proposed device a "gunge plug" that could be removed by a user so that they could insert a finger into the body of the device and sweep out any detritus that had accumulated in it.

Whilst this arrangement functions well it does rely upon users of "bath bomb" type products whose baths have overflowed cleaning out their overflow control devices, and whilst we have found that domestic users of our devices do tend to do this it is the case that in a commercial environment such as a hotel guests tend not to know that our device is installed, and even if they do know tend not take the time to clean out any detritus that may have accumulated in the device following an overflow of a bath in which they have used a "bath bomb" type product.

In such circumstance a build-up of detritus in the device may occur, and that detritus may inhibit the device from functioning properly in the event that an overflow should subsequently occur.

The present invention has been devised with the foregoing in mind.

SUMMARY

To this end a preferred embodiment of the present invention provides an automatic fluid flow control device for a fluid supply, the device comprising: an actuator that carries or includes a magnet, the actuator being movable within a housing from a first position corresponding to a normal fluid supply to a second position corresponding to a fluid oversupply, wherein the actuator is removable from the housing to enable the device to be cleaned, and the housing and actuator are configured so that the actuator can only be accommodated in the housing in an orientation that enables said magnet to exert a magnetic force to close a valve in said fluid supply as said actuator moves from said first to said second position.

One advantage of this arrangement is that as the user can remove the actuator from the housing so access can be had to the inside of the housing for the purposes of thoroughly cleaning the inside of the housing to remove any accumulated detritus.

Furthermore, whilst it is generally not desirable to provide a user with access to the internal components of a safety device of this type, the particular configuration of the present invention reduces the chance of a user incorrectly re-assembling the device after cleaning.

If a user were to incorrectly reassemble the device so that the polarities of the magnets within the device were mismatched, it is possible that the device may not function as intended in the event of an overflow. Furthermore, as the magnetic interaction between the magnet and valve is not a visible feature, it would be extremely difficult for a user whose device has ceased to function to determine that the problem lies with the orientation of the magnets in the device, and not with some other part of the device (particularly in circumstances, as in preferred embodiments of the present invention, where a user cannot gain access to the valves of the device once the device is assembled).

As will be appreciated, preferred embodiments of the present invention address all of these disadvantages whilst still permitting a user to disassemble the device for cleaning.

In a preferred arrangement the device comprises an actuator guide, the actuator being mounted on said guide for movement with respect thereto between said first and second positions, wherein the actuator and guide are configured so that the actuator can only be mounted on the guide in one orientation. The actuator guide may comprise part of the housing.

In one envisaged arrangement the actuator includes a holder in which a magnet may be secured, the holder being configured so that the magnet may only be secured in the pocket in an orientation where the magnet is capable of magnetically interacting with the valve to close the valve.

The actuator may further comprise means moveable between a first position where it retains a magnet in the holder and a second position where the magnet can be withdrawn from the holder. Means for restraining movement of said movement means to said second position may also be provided, and in one envisaged arrangement the restraining means may comprise a float.

Further advantages and preferred features of this embodiment are set out elsewhere in the present application.

Another aspect of the present invention addresses the potential for problems to occur were solid matter to be drawn into the device that interferes with the float mechanism, which interference could potentially prevent the floats from moving and the device from functioning correctly.

To address this particular problem an embodiment of the invention provides a fluid flow control device comprising: an actuator guide, and an actuator movable on said guide, wherein the actuator and the guide comprise respective surfaces that face one another and move over each other as the actuator moves relative to the guide, one of said surfaces comprising one or more surface formations with a surface area abutting the other of said surfaces that is less than the are of the surface on which said formations are provided.

Another aspect of the present invention addresses the problem that as the spaces into which devices of this type are installed are typically quite restricted (for example the space between a bathtub and the wall), the device itself should be relatively thin so that it can readily be slotted into the space available behind a bathtub, for example. As such, the logical choice of shape for the device is for it to be a rectangular parallelepiped (i.e. a three-dimensional body with a rectangular cross-section) because such a shape meets the dual requirements of having sufficient width to provide space for the internal components and a relatively small depth. The device disclosed in our previous patent had roughly such a shape (see FIGS. 7 and 8 for example), and comprised a moulded body formed of top and bottom sections that were fastened together at a number of points (see FIG. 10 for example) around the periphery of the moulded body.

A disadvantage of this arrangement is that the provision of fixings in the vicinity of the inlet to the device (from the appliance overflow) necessarily increased the depth of the device and hence sometimes made it harder to fit the device in the space available behind some appliances, such as a bathtub for example. It would therefore be advantageous to remove the fixings in the vicinity of the inlet to reduce the thickness of the device, but the removal of those fixings would mean that the regions of the top and bottom sections in the vicinity of the inlet were only coupled together by the fixings at either end of the device, and as the device is manufactured from a plastics material that has the potential to creep (i.e. to change shape) over time there is the potential for leaks to occur.

To address this problem, another embodiment of the present invention provides a fluid flow control device comprising first and second portions that are configured to be coupled one to the other by a plurality of fixings to define an internal void, wherein a peripheral wall of one of said first or second portions is curved between two adjacent fixings towards a peripheral wall of the other of said first or second portions so that on coupling the first and second portions together the portion with the curved wall flexes so that at least a portion of said curved peripheral wall is placed in compression (against the other peripheral wall).

An advantage of this arrangement is that by placing at least part of the wall under compression, the likelihood of leaks occurring between the first and second portions can be reduced. Preferably, the portion with the curved peripheral wall is of a plastics material. More preferably both said first and said second portions are of plastics material.

Another potential problem associated with the lack of the space into which devices of this type are installed is the fact that it can sometimes be difficult to couple the overflow inlet of the device to the overflow outlet of the appliance (e.g. a bathtub) that the device is protecting from an overflow. Although flexible couplings, the like of which are well known in the plumbing industry, go some way towards facilitating the coupling of the overflow inlet of the device to the overflow outlet of the appliance, they are relatively stiff and hence not easily bendable through tight turns. As a consequence it would be advantageous if the device itself could be configured to facilitate its' installation.

To this end, another embodiment of the present invention provides a coupling for attachment to an inlet or an outlet of an automatic fluid flow control device, wherein the coupling comprises a first tubular portion configured to attach to the inlet or outlet of the automatic fluid flow device, and a second tubular portion set at an angle to said first portion.

The advantage of this arrangement is that by setting the second tubular section at an angle to the first tubular section, any flexible couplings required to connect the coupling to the overflow of a bath, for example, or to the drain will typically have to be bent to a smaller extent than would have been the case were the first and second tubular portions to be axially aligned.

The coupling may have one or more for the following features: it may be removable from the automatic fluid flow control device; it may be rotatable with respect to the fluid flow control device; the fluid flow control device and the coupling may be provided with respective complementary parts of an engagement mechanism; the coupling may be attached to the fluid flow control device in one of a plurality of predefined orientations; the first tubular portion may include one or more bleed ports in a peripheral wall of the tubular portion so that, when inserted in the outlet of an automatic fluid flow device, two fluid pathways are formed for egress of fluid from the device.

A related embodiment provides a fluid flow control device having a port defined by a wall of the device, said wall having an external surface that is provided with a tactile formation, and a removable coupling (for example a coupling of the type described above) for attachment to the port, the coupling having a tactile formation formed on the exterior of a peripheral wall thereof, the arrangement being such that the coupling is properly attached to the port of the fluid flow control device when the tactile formation on the exterior of the coupling wall is aligned with the tactile formation on the exterior of the device wall.

The advantage of this arrangement is that the coupling can readily be correctly coupled to the port even when the device or the port is hidden from view.

Another aspect of the present invention addresses problems associated with the testing that is undertaken to ensure that the devices we manufacture operate to specification before they are released for sale. In particular, each device we manufacture is tested to ensure that it operates properly, and that there is no leakage before it is release for sale.

In this connection it is preferred for fluid to be able to bleed past the valves in the valve assemblies so that the device more quickly resets when the taps are shut off following the occurrence of an overflow. The bleed rate is determined by monitoring fluid pressure within the valve assemblies, but as the testing needs to be concluded relatively quickly the fluid pressures measured are relatively small and we have found that fluid forced into the valve of the valve assembly whilst the valve is open can seep out of the valve when the valve is closed and cause pressure perturbations that adversely affect the accuracy of the fluid pressure measurements that we take to determine whether the bleed rate is acceptable.

One way to avoid this problem would be to hermetically seal the magnet within the valve. However, hermetically sealing the magnet in the valve is expensive to accomplish, and it would be much preferred if a less expensive way could be found to address this problem.

To address this problem, another embodiment of the invention provides a valve assembly comprising a valve that is moveable from an open position to a closed position where the valve bears against a valve seat to shut off or at least substantially restrict fluid flow through the valve assembly, wherein fluid under pressure can seep into the valve when the valve is in the open position and the valve comprises means operable to facilitate the egress of any fluid that has seeped into the valve in the event that the valve should move from said open position to said closed position.

Yet another embodiment provides a valve assembly comprising a valve seat and a valve that is moveable from an open position to a closed position where the valve bears against the valve seat to shut off or at least substantially restrict fluid flow through the valve assembly, the valve including means for permitting fluid to bleed past the valve when the valve is in said closed position. The permitting means may comprise a channel formed in a face of said valve that bears against the seat. The valve may comprise multiple components and means may be provided to ensure that those components can only be assembled in one orientation.

Yet another embodiment of the present invention provides a flap valve comprising a valve body, a resilient member securable to the valve body, and means for ensuring that the resilient member can only be secured to the valve in one orientation.

Another problem we have encountered is that mains water in some countries around the world has relatively high levels of chlorine and other additives (at least in comparison to mains water in the UK), and these additives can attack certain (typically lower) grades of plastics. To avoid this problem it is usual to use a much higher grade of plastics for applications where there is contact with mains water. However, a significant problem is that these higher grade plastics are very much more expensive than lower grade plastics materials and it would therefore be advantageous to reduce the amount used.

To address these issues another preferred embodiment of the present invention provides a fluid flow control device wherein those components of the device that are usually in contact with fluid in use are formed from a higher grade plastics material than those components which are not usually in contact with fluid in use. In a particularly preferred arrangement there is provided a fluid flow control device wherein those components of the device in contact with pressurised fluid in use are formed from a higher grade of plastics material capable of withstanding at least 10 bar of fluid pressure, than those components which are in contact with fluid at atmospheric pressure in use.

In a particular embodiment, those components of the device which are only in contact with fluid in an overflow condition are formed from a lower grade plastics material. The higher grade plastics material may be configured to withstand at least 10 bar fluid pressure and/or may be of engineering grade plastics. In a particularly preferred embodiment the lower grade plastics material is polypropylene (preferably glass reinforced polypropylene) and the higher grade plastics material is Fortron (preferably glass reinforced Fortron) (Fortron being an engineering polymer available from Ticona UK Ltd., Hollinswood House, Stafford Court, Telford TF3 3DD, United Kingdom).

Another aspect of the present invention addresses issues that have arisen from the exhaustive testing we have undertaken to ensure that the device disclosed in our prior patent meets the applicable regulatory requirements for installation in premises throughout the UK.

One requirement for such devices is that there should be a clear delineation between pathways for dirty waste water and clean (potable) water, and furthermore that there should be no possibility for leakage between those pathways. In our previously disclosed device, we identified that at extremely high supply pressures (probably far in excess of the actual pressure at which fluid is provided to any premises in the UK) there is the theoretical possibility for failure of the seal between the top and bottom sections of the device, following which leakage between the clean and waste water pathways may occur.

In accordance with another embodiment of the present invention there is provided a fluid flow control device comprising a valve assembly housing a valve and a separate actuator chamber housing an actuator, the actuator chamber and valve assembly being coupled together to form a single unitary device. The advantage of this arrangement is that by providing two discrete components that are coupled together to form a single unitary device, a leakage from one of the components will not interfere with fluid flow through the other of the components.

Another embodiment of the present invention provides a valve assembly for coupling to an actuator chamber to provide a single unitary device, and yet another embodiment of the present invention provides an actuator chamber for coupling to a valve assembly to provide a single unitary device.

The valve assembly and actuator chamber may be provided with respective complementary components of a two-part engagement mechanism. In one embodiment the mechanism may be configured to provide a snap-fit coupling of the valve assembly and actuator chamber. The mechanism may comprise one or more fingers mounted on the actuator chamber, said one or more fingers being configured to snap over a projection (for example a circumferential peripheral wall) provided on the valve assembly and the actuator chamber. The one or more fingers and the projection may be configured to resist decoupling of the valve assembly and the actuator chamber.

In another embodiment of the present invention there is provided a valve assembly for a fluid flow control device, the valve assembly comprising hollow first and second components that are capable of being coupled together to form an internal void within which a valve is provided, the first and second components each comprising a peripheral wall that is provided with an alignment marker on its exterior, wherein coupling of said first component to said second component to a correct torque setting is accomplished when the alignment marker on said second component is aligned with the alignment marker on said first component.

Another disadvantage of the arrangement we previously proposed is that as access can be had to the valve assemblies once the top and bottom sections of the device have been separated, it is possible for a person to disassemble and potentially incorrectly reassemble the valve, following which the device may not operate properly in the event of an overflow.

To address this disadvantage there is provided, in accordance with another embodiment of the present invention, a fluid flow control device comprising a two-part valve assembly defining an internal void within which a valve is provided, and a separate actuator chamber housing an actuator, wherein the actuator chamber and valve assembly are coupled together to form a single unitary device, and the actuator chamber and the valve assembly include complementary formations that cooperate to resist disassembly of the two-part valve assembly whilst the valve assembly and actuator chamber are coupled together.

In a particularly preferred embodiment the complementary cooperating formations comprise a projection on the exterior of the valve assembly that is receivable within a complementary groove in an external wall of the actuator chamber. In another particularly preferred arrangement the complementary formations also function as alignment markers to indicate when the two components have been coupled together to the correct torque setting.

In accordance with another embodiment of the present invention there is provided a fluid flow control device comprising a two-part valve assembly defining an internal void within which a valve is provided, and a separate actuator chamber housing an actuator, wherein the actuator chamber and valve assembly are coupled together to form a single unitary device, and the actuator chamber and the valve assembly include complementary formations that cooperate to align the valve assembly and actuator chamber and the valve with the actuator when the valve assembly and actuator chamber are coupled together.

In a particularly preferred arrangement, the interengaging formations function to resist disassembly of the two-part valve assembly and to align the valve assembly and actuator chamber.

In all embodiments it is preferred that device is operable in the event of an overflow, and without requiring a supply of electricity, to automatically shut off or at least substantially reduce fluid flow through a fluid supply.

Other preferred features and advantages of the present invention are set out elsewhere in this specification.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIGS. 2 to 7 are, respectively, a front elevation, a rear elevation, a left side elevation, a right side elevation, a top plan view and a bottom plan view of the device depicted in FIG. 1;

FIG. 19a is an isometric view of a valve assembly, and FIG. 19b is a cross-sectional view along the line E-E in FIG. 19a;

FIG. 22 is a perspective view of a coupling for use with the device of FIG. 1;

FIG. 23 is a schematic representation of a cam track;

FIG. 24 is a plan view of the coupling shown in FIG. 22; and

FIG. 25 is a side elevation of the coupling shown in FIG. 21.

DETAILED DESCRIPTION

Figure 1:
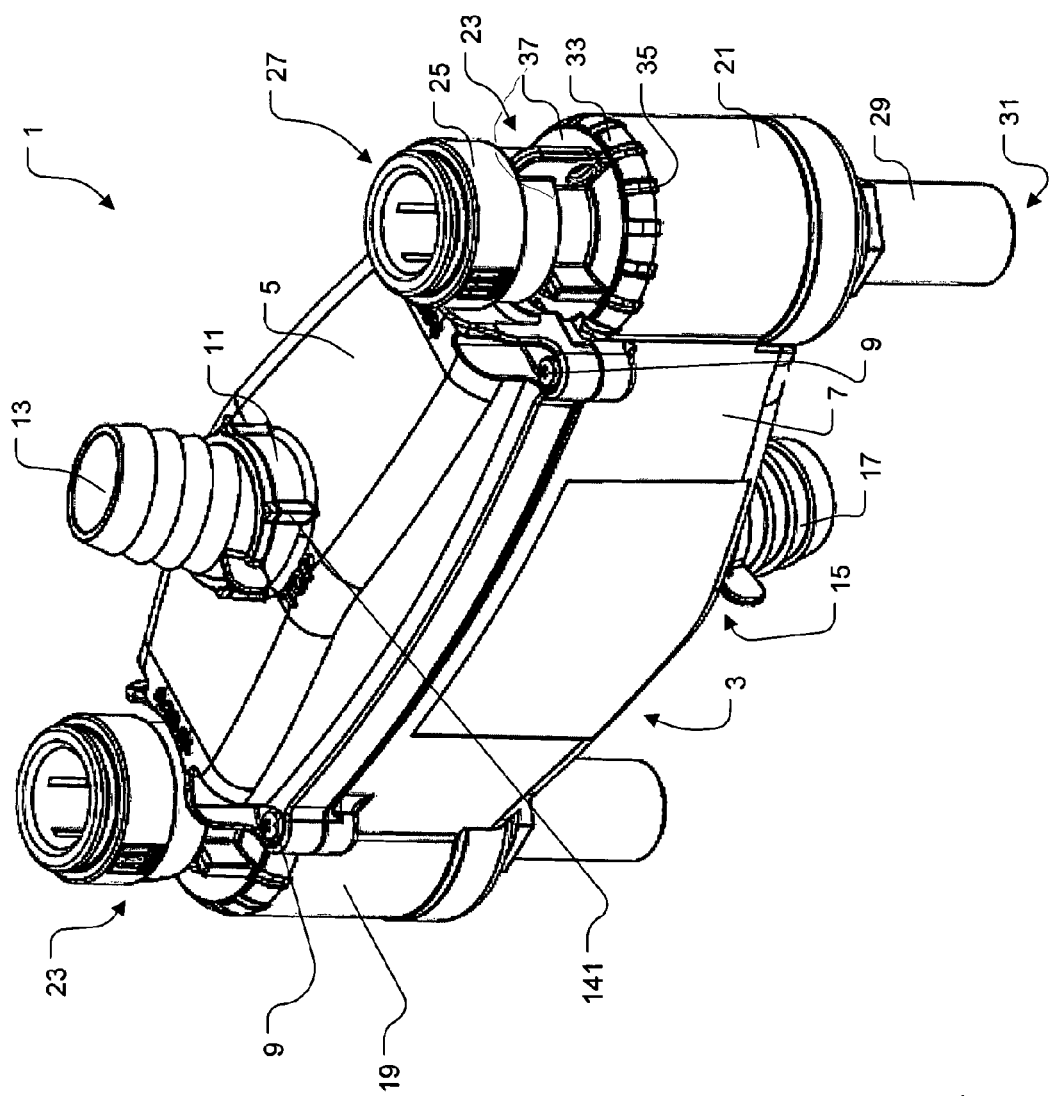
FIG. 1 is a front isometric view of a device according to a preferred embodiment of the present invention.

The automatic fluid flow control device described hereafter operates in a similar way to that in which the device disclosed in our earlier United Kingdom patent operates, and reference should be made to that document for additional details of how the device operates.

Referring now to the drawings, the fluid flow control device 1 is automatically operable, without requiring an electrical supply, to shut-off or at least substantially restrict the flow of fluid to an appliance in the event that an oversupply of fluid (referred to hereafter as an overflow condition) should occur.

The device 1 comprises an actuator chamber 3 formed by a top portion 5 and a bottom portion 7 that are coupled together by a plurality of fixings 9, in this particular case screws.

The top portion 5 includes an inlet 11 in which a barbed coupling 13 has been inserted. The barbed coupling 13 is configured to be connected to the overflow outlet of an appliance (not shown) such as a bathtub, for example by means of a flexible coupling, in particular by a braided flexible coupling.

The bottom portion 7 includes an outlet 15 in which a second barbed coupling 17 has been inserted. The barbed coupling 17 is configured to be connected to a drain inlet (not shown), for example by means of a flexible coupling. The bottom portion further comprises left and right tubular wings 19, 21 in each of which a valve assembly 23 is securely received.

The valve assemblies 23 (see also FIG. 19) comprise a first component 25 which includes an outlet 27 that can be coupled, for example by means of a flexible coupling, to a tap of a bath, and a second component 29 which includes an inlet 31 for coupling, for example by means of a flexible coupling, to a fluid supply.

Figures 19A, 19B:
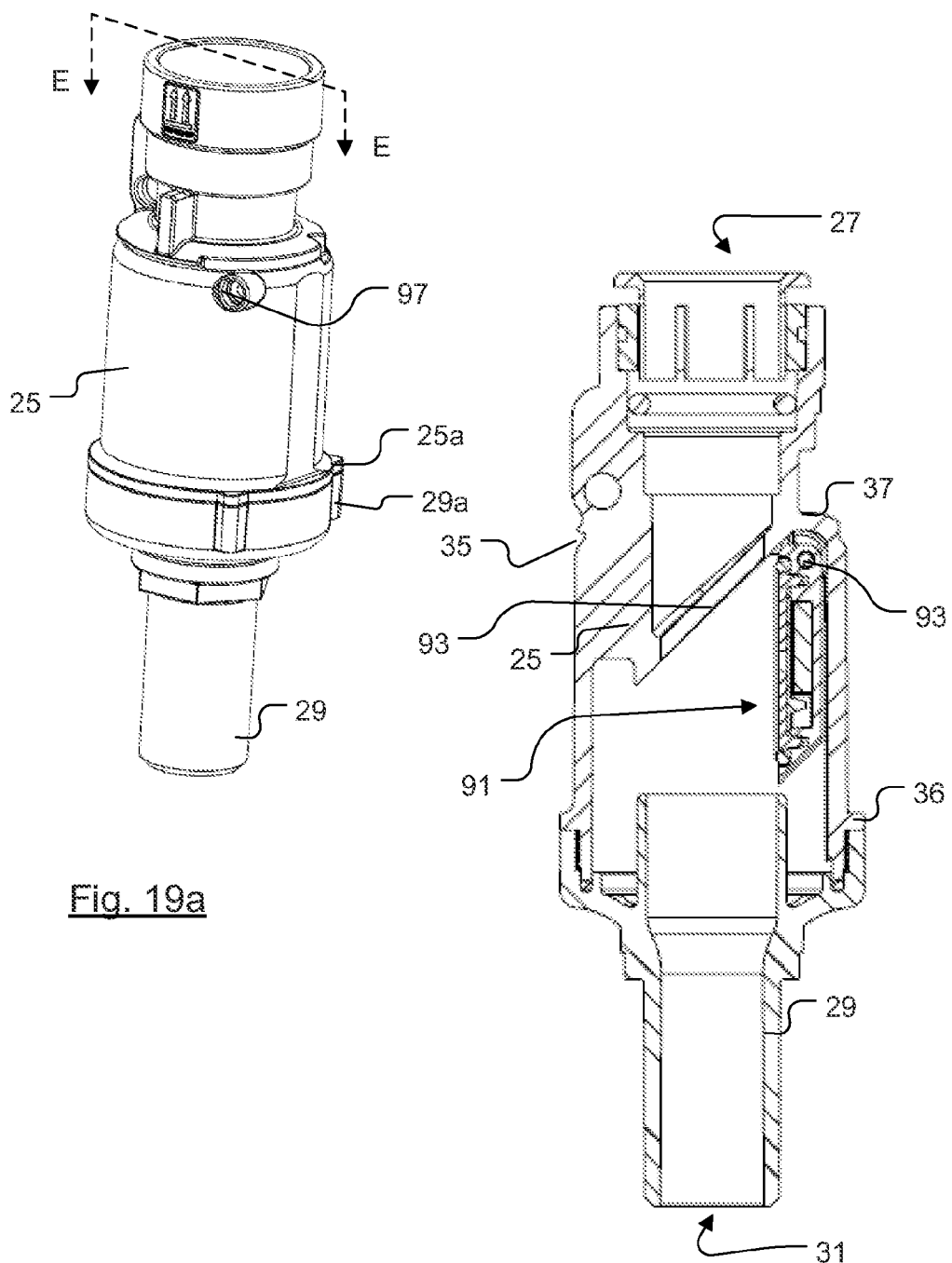

As shown in FIG. 19a, the peripheral wall of the first component 25 of the valve assembly includes, at or near the edge that is closest to the second component when the two components are coupled together, an external tactile formation 25a. Likewise, the peripheral wall of the second component 29 of the valve assembly also includes, at or near the edge that is closest to the first component when the two components are coupled together, an external tactile formation 29a. In the preferred embodiment the two tactile formations comprise projections (preferably identical triangular projections), and the arrangement is such the first and second parts can be screwed together until the two tactile formations are aligned, at which point the alignment of the tactile formations signifies that the first and second components have been coupled together to the correct torque setting. In the preferred embodiment the first and second components are each provided with a pair of tactile formations for alignment with one another.

The valve assemblies are securely received within the tubular wings 19, 21 of the by pushing the outlet end of each valve assembly upwards (in the orientation shown in FIG. 1) through the respective tubular wing 19, 21 until a plurality of fingers 33 (see also FIG. 10) snap-fit behind a circumferential wall 35 formed in the periphery of the valve assembly. The fingers are configured to resiliently and outwardly deform as a peripheral shoulder 37 on the first component of the valve assembly is pushed through the tubular wing, following which the fingers inwardly snap-fit behind the aforementioned circumferential wall 35. As will be appreciated by persons skilled in the art, once the fingers 33 have snapped behind the wall 35, the valve assembly can no longer be withdrawn from the tubular wing of the actuator chamber 3. The first component 25 of each valve assembly is also provided with a shoulder 36 (see FIG. 19) that bears against the respective wings 19, 21 to prevent the valve assemblies from being pushed through the wings.

Referring now to FIG. 7, in a particularly preferred embodiment of the invention the bottom portion 7 of the actuator chamber 3 is provided with a pair of grooves 38 (for each valve assembly) into which the aforementioned aligned tactile projections (on the periphery of the first and second components of the valve assembly) slide as the valve assemblies are pushed into the respective tubular wings 19, 21 of the actuator chamber 3. As will be appreciated, if only a single set of alignable formations are provided, then only one groove need be provided in the bottom portion 7.

The receipt of the aligned tactile formations in the grooves 39 serves two functions. In the first instance it ensures that the valves within the valve assemblies are correctly aligned with the actuator within the actuator housing 3 so that magnets carried by the actuator can magnetically interact with magnets carried by the valves. In the second instance, it ensures that the second component of the valve assembly cannot be decoupled (to give access to the valves) from the first component whilst the valve components are received within the tubular wings 19, 21 of the actuator chamber 3.

The snap-fit of the fingers 33 behind the circumferential wall 35, the receipt of the aligned tactile formations in the grooves 39 and the abutment of the shoulders 36 with the wings together function as an effective tamper prevention mechanism as the valve assemblies cannot readily be removed from the actuator chamber 3 and cannot readily be disassembled once the valve assemblies have been pushed into the tubular wings.

Figure 8:
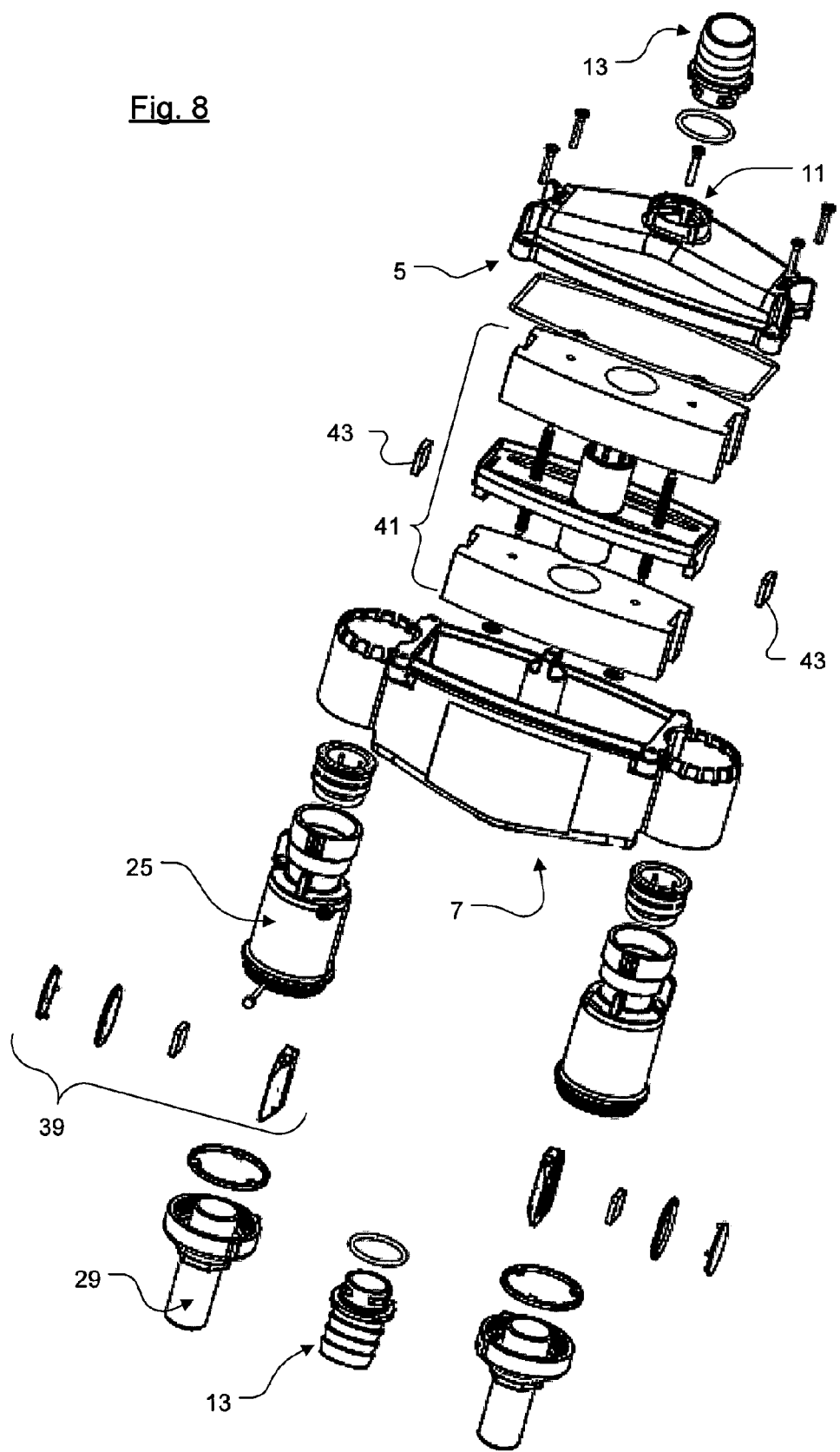
FIG. 8 is an exploded isometric view of the device depicted in FIG. 1 with all of the components of that device shown.

Referring now to FIG. 8 of the drawings, the top 5 and bottom sections 7 of the actuator chamber define an internal void in which an actuator in the form of a float assembly 41 is provided. Magnets 43 (which, in the preferred embodiment are of Samarium Cobalt) are inserted into a component of the float assembly 41 and are carried with the assembly as it moves.

Figure 20:
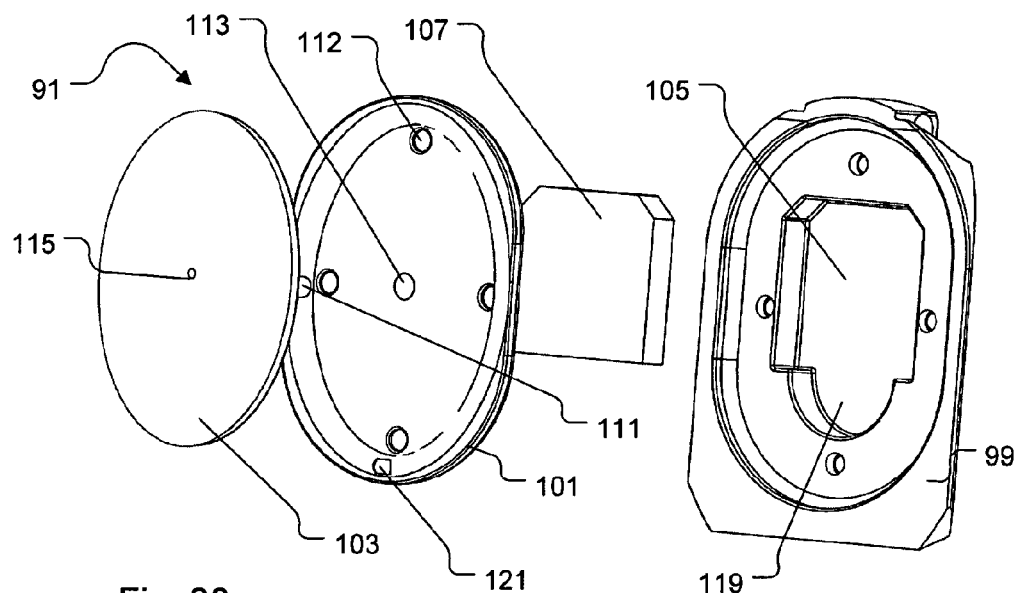
FIG. 20 is a front isometric exploded view of a valve for the valve assembly of FIG. 19.
Figure 21:
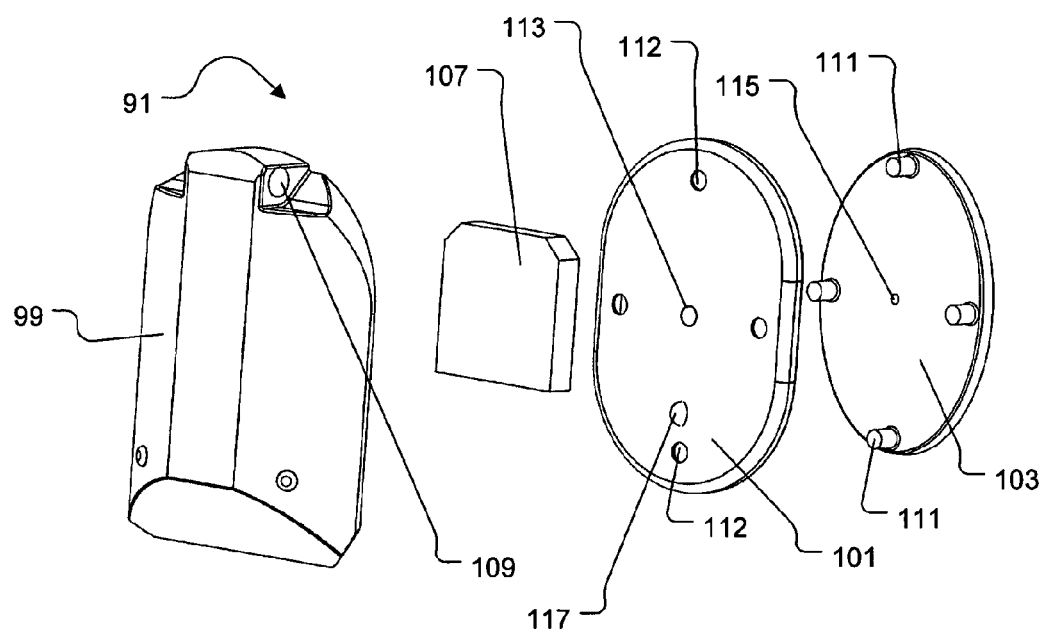
FIG. 21 is a rear isometric exploded view of the valve shown in FIG. 20.

The first 25 and second 29 components of the valve assembly also define an internal void within which a flap valve 39 is provided, the flap valve 39 being shown in more detail in FIGS. 20 and 21 of the accompanying drawings.

To assemble the device, the flap valve 39 is assembled, following which the valve is secured within the first component 25 of the valve assembly and the second component is screwed to the first component until the aforementioned tactile formations 25a, 29a are aligned. This process is then repeated, in this illustrative example, for the other valve assembly.

Once the valve assemblies have been constructed, they are aligned with the bottom section so that the tactile formations 25a, 29a can move into the corresponding grooves 38 and are then pushed into the respective wings until they lock in place.

The float assembly is then constructed, in a manner that will later be described, and magnets are inserted into each of the two magnet holders formed in a component of the float assembly. The completed float assembly is then placed in the internal void defined by the bottom section 7 of the actuator chamber, following which the top section 5 is securely coupled to the bottom section.

Once this has been completed and any desired additional fittings (such as the aforementioned barbed connectors 13) have been inserted, the device is ready for testing and if that testing should be completed satisfactorily, sale.

Figure 9:
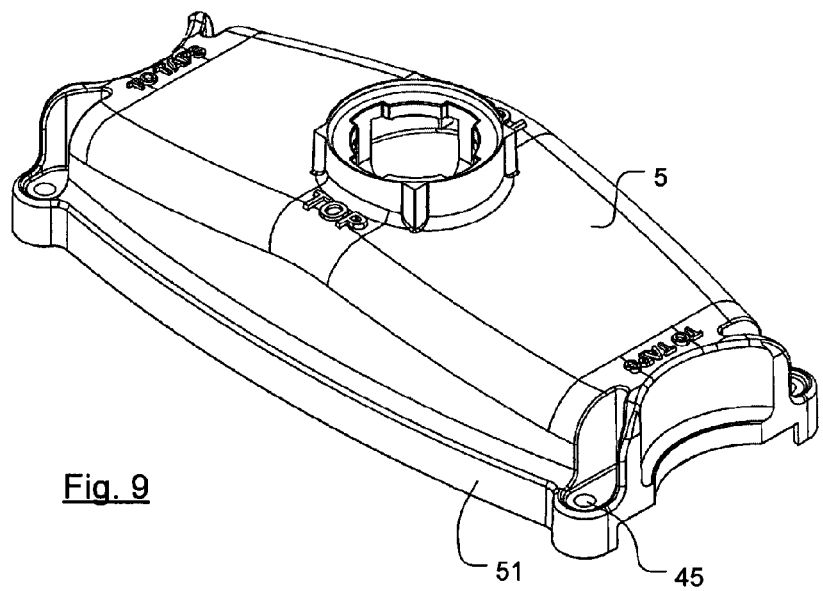
FIG. 9 is an isometric view of a top portion of an actuator chamber.
Figure 10:
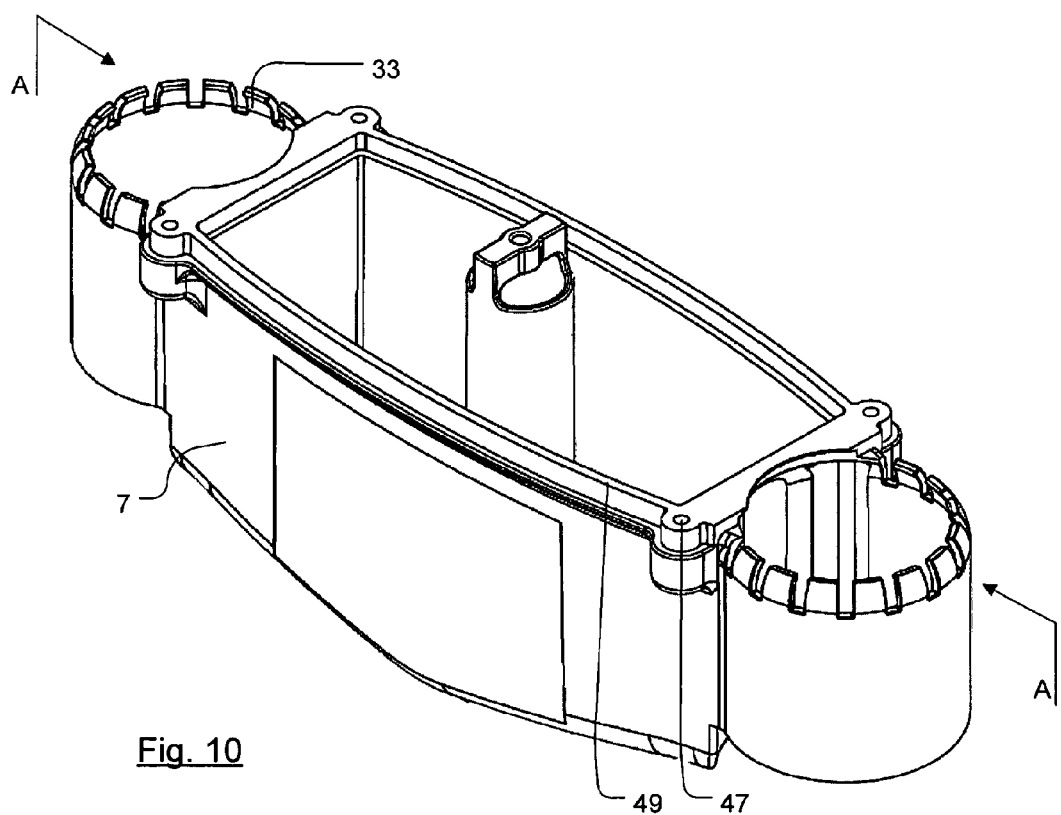
FIG. 10 is an isometric view of a bottom portion of the actuator chamber.

FIGS. 9 and 10 are isometric views of, respectively, the top section 5 and the bottom section 7 of the actuator chamber 3. As shown in FIG. 9, the top section is generally rectangular in plan view and is provided with four internally threaded through-holes 45, one in the vicinity of each corner.

The bottom section 7 comprises four complementary internally threaded through holes 47 that are arranged to correspond in position to the through-holes 45 in the top section 5 when the top section is mounted to the bottom section 7. The bottom section also comprises a peripheral wall 49 that fits within a groove (not shown) in the underside of a complementary peripheral wall 51 of the top section (typically with a sealing member such as an o-ring in between them) when the top section is fitted to the bottom section.

Figure 2:
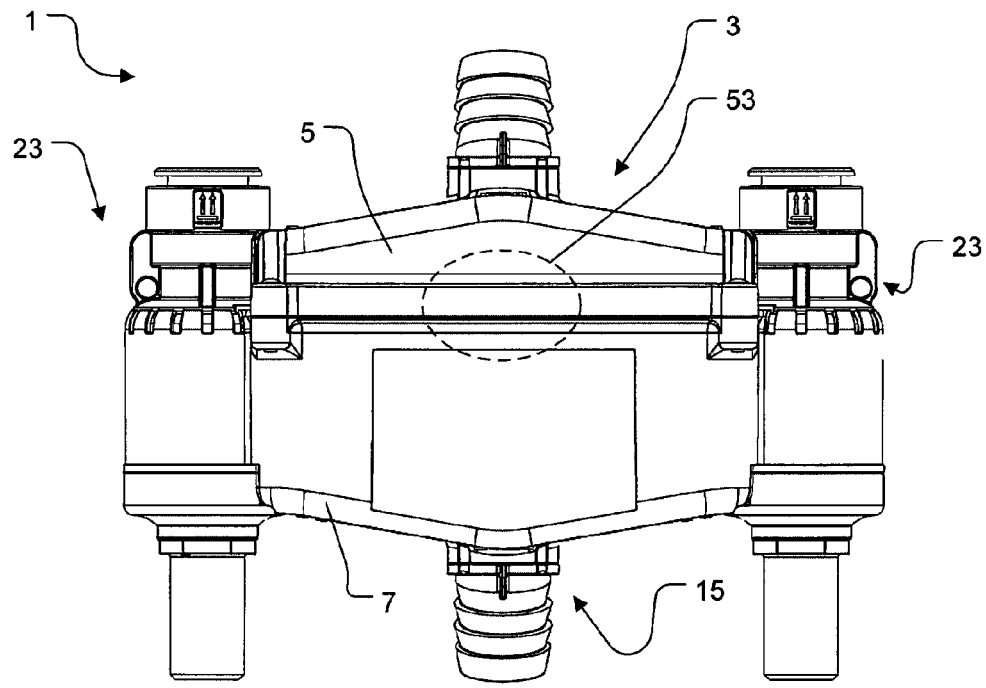
Figure 3:
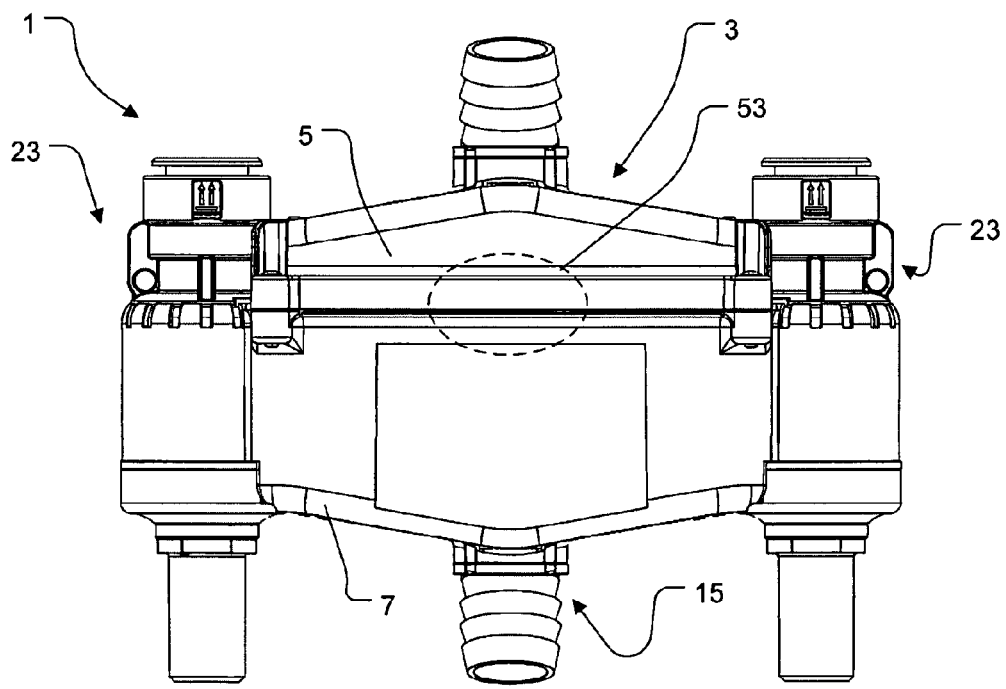

As will be appreciated from FIG. 2 or 3, for example, when the top and bottom sections are secured together by screws passed through the aligned through holes 45, 47, there are regions 53 (one of which is shown in FIG. 2, the other of which is shown in FIG. 3) of the interengaged top section peripheral wall 51 and bottom section peripheral wall 49 that are quite a large distance, for example more than 5 cm, from the nearest securing screws. Because of the aforementioned problem of plastic creep there is the potential for the shape of the peripheral walls to change over time, and leaks can occur in areas such as regions 53 where the nearest fixing are some distance away.

To address this problem instead of forming the peripheral wall 51 of the top section 5 so that it is parallel to the peripheral wall 49 of the bottom section 7, we have instead formed the peripheral wall 51 of the top section 5 so that each long side is slightly convex (i.e. curved towards the peripheral wall 49 of the bottom section 7) between through holes 45 at adjacent short ends of the top section 5.

The effect of this is that when the top and bottom sections are fitted together and screws are screwed into the aligned screw holes 45, 47 the top section flexes very slightly and a compressive force is generated (at least) in the aforementioned regions 53 which compressive force helps to hold the peripheral walls together and hence helps reduce the likelihood of leaks occurring even if plastic creep should occur. An alternative, but functionally equivalent arrangement, would be to form the peripheral wall 49 of the bottom section 7 so that it is each long side of the bottom section that is slightly convex (i.e. curved towards the peripheral wall 51 of the top section 5).

As an illustration we have found that a curvature which extends the mid point of the long sides of the peripheral wall 49, 51 by 1 mm or less relative to the peripheral wall adjacent the fixings provides sufficient compressive force to address the potential for leaks in the event that plastic creep occurs.

Figure 11:
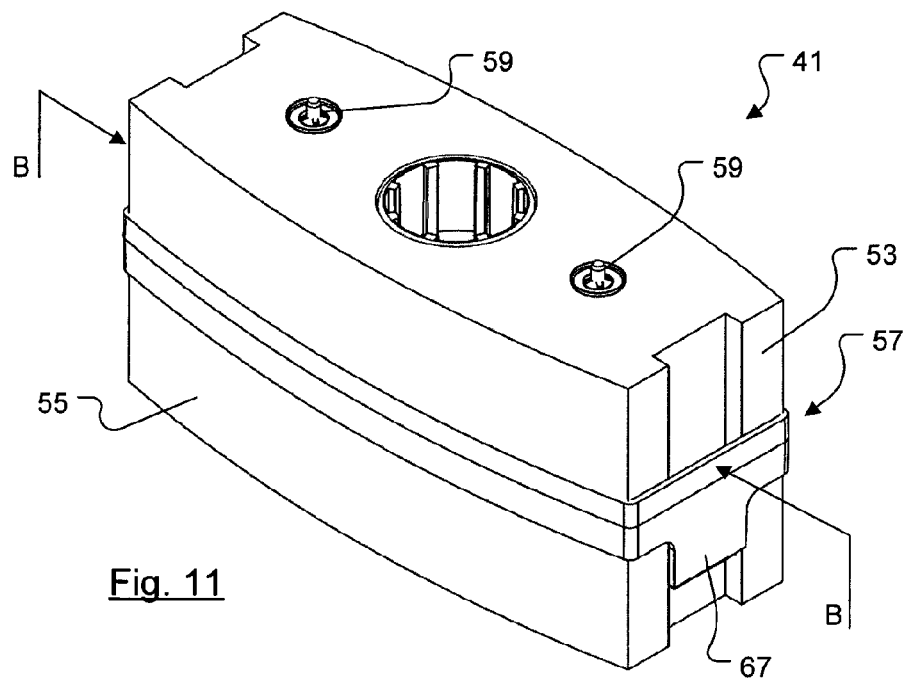
FIG. 11 is an isometric view of a float assembly.
Figure 12:
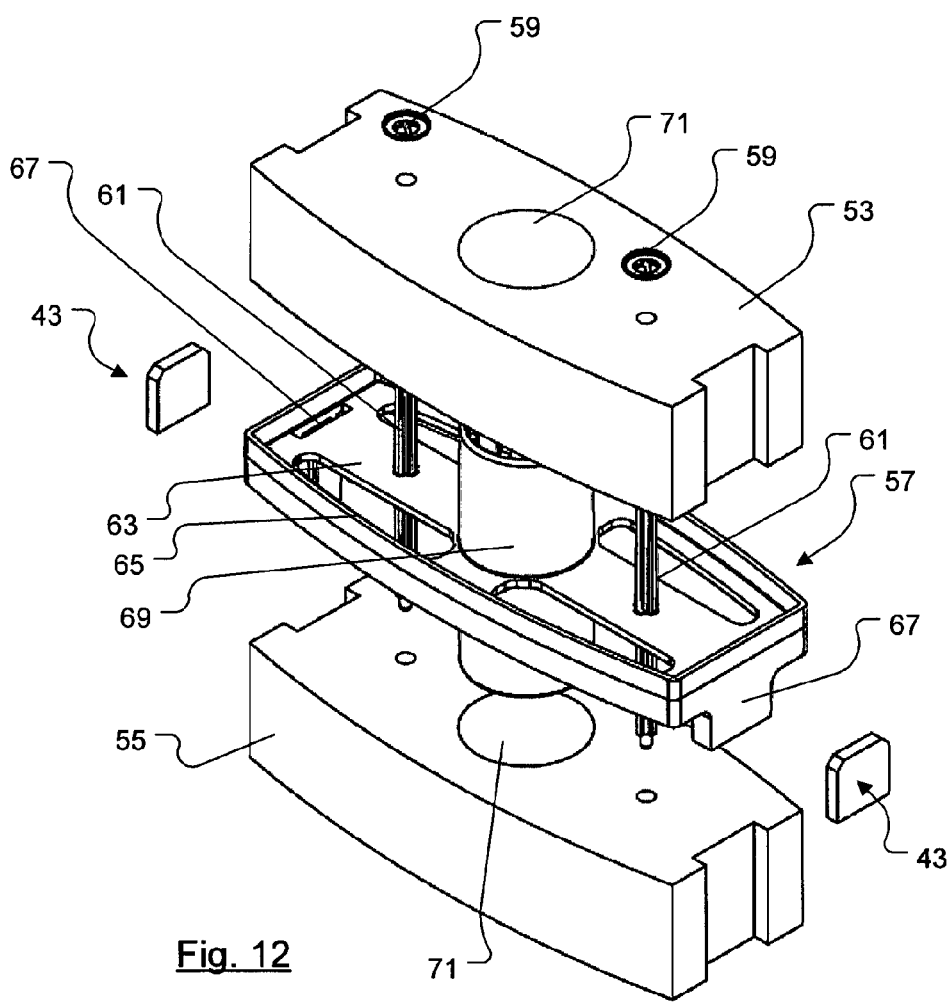
FIG. 12 is an exploded isometric view of the assembly shown in FIG. 11.

Referring now to FIGS. 11 and 12 of the drawings there is depicted, respectively, an isometric and exploded isometric view of the float assembly 41. The float assembly comprises upper 53 and lower 55 foam pads that are secured to a float carrier 57 by fixings 59 that engage with four bayonet pins 61 (one at either end of each bayonet) that pass through the foam pads and the float carrier 57.

The float carrier 57 is in the form of a spider and comprises a generally planar section 63 that terminates in a peripheral wall 65 which forms part of first and second holders 67 into each of which a magnet 43 is inserted. The float carrier comprises a tubular portion 69 that extends upwardly and downwardly from the planar section and fits within holes 71 formed in the upper and lower foam pads 53, 55.

Figure 13:
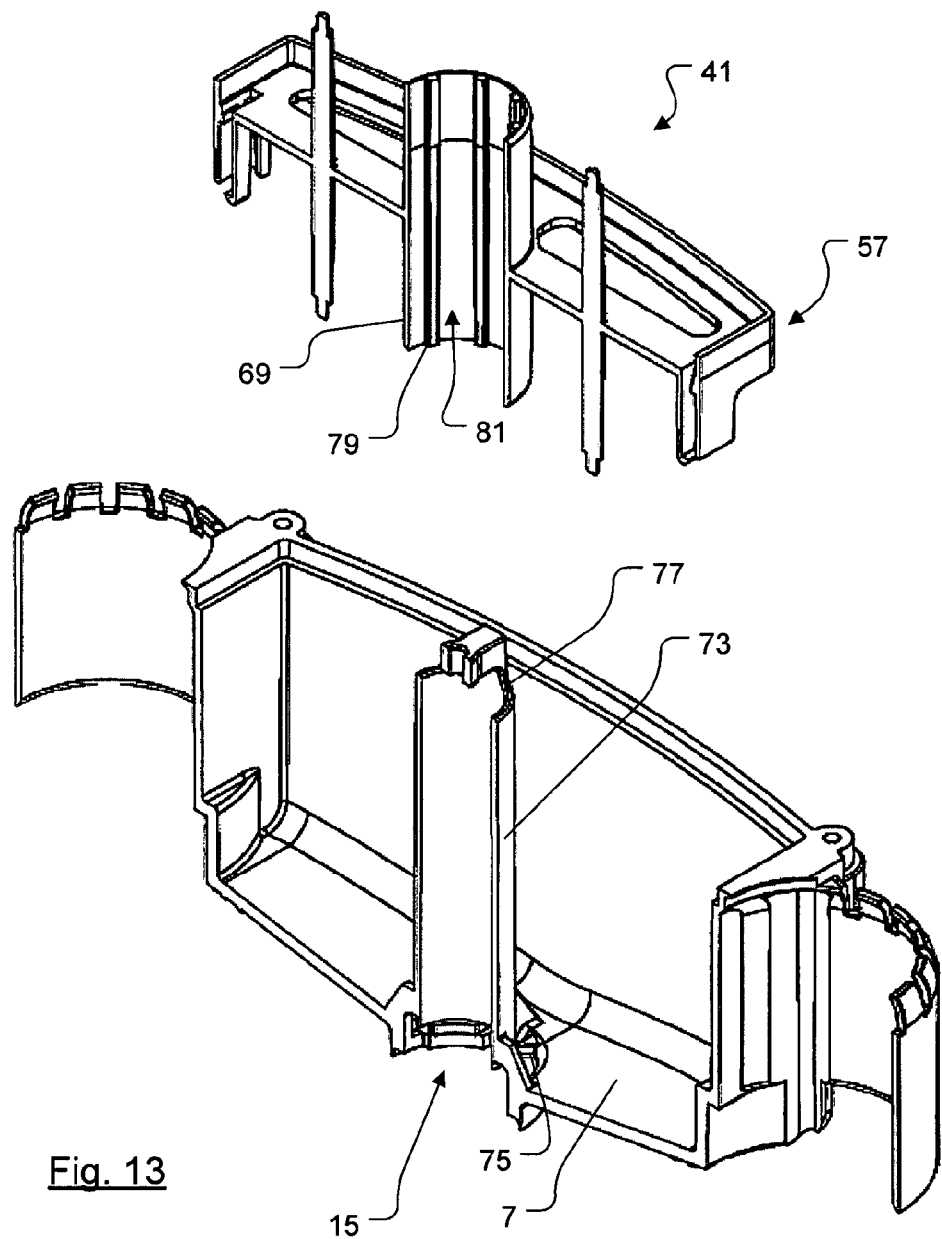
FIG. 13 is a cross-sectional view of the bottom portion along the line A-A shown in FIG. 10 and a cross-sectional view of a float carrier of the float assembly along the line B-B shown in FIG. 11.

As shown in FIG. 13, the bottom section 7 comprises a hollow column 73 that functions as an actuator guide 73 and is directly connected to the outlet 15. The column includes a plurality of openings 75 at its base that allow fluid which enters the actuator chamber to exit to a drain. However, as is described in more detail in our previous patent, if an overflow event occurs fluid will enter the actuator chamber via the inlet in the top section (not shown) more quickly than it can exit from the chamber via the openings 75 and the level of fluid within the chamber will increase until the fluid spills over the upper end 77 of the column 73 to exit from the chamber through the column 73.

The tubular portion 69 of the float carrier is sized to fit over the column 73 so that the float assembly (of which only the float carrier is shown for clarity) is located within the bottom section in such a fashion that the float carrier can slide up the column in the event of an overflow to move the magnets 43 and hence cause the valves in the valve assemblies to operate to shut-off or at least substantially reduce the flow of fluid therethrough. Further details of the way in which this happens can be found in our previously granted UK patent.

As aforementioned, it is popular for persons to use products such as bath bombs and it is not unusual for these bath bombs to include solid matter such as flower petals, leaves or confetti. This material tends to float and as such it can flow into the actuator chamber 3 if an overflow condition should occur. Once this material is in the chamber it can form a paste-like gunge that can become lodged between the outer surface of the column 73 and the inner surface of the tubular portion 69. As the gunge builds up between these surfaces it is possible to reach a point where the adhesive force provided by the gunge between the surfaces is of such a magnitude that the float assembly no longer rises when fluid is introduced into the actuator chamber 3, whereupon the device can fail to operate.

To alleviate this situation we have provided the inner surface of the tubular portion with a plurality of parallel, longitudinally extending ribs 79 that, in the first instance, provide areas 81 of increased separation between the inner surface of the tubular portion 69 and the outer surface of the column 73 to promote fluid flow between the surfaces that helps to clean out any gunge that forms between them. The provision of a ribbed internal surface also acts to reduce the surface area of the tubular portion internal surface that is immediately adjacent the outer surface of the column, to reduce the area of the tubular portion inner surface that could be adhered to the outer surface of the column, to reduce the extent of any adhesive force that the gunge may provide, and hence to reduce the likelihood of gunge within the device causing the device to fail to operate as expected.

An alternative, but functionally equivalent arrangement, would be to provide a tubular portion 69 with a smooth inner surface and to provide the outer surface of the column with a plurality of parallel ribs.

In another arrangement, structures other than ribs may be formed on one of the two surfaces. For example, the structures may comprise a plurality of discrete lands or pins extending from one surface towards the other.

As the float assembly carries magnets 43 that interact with magnets in the valve assemblies, it is important for the float assembly to be properly orientated within the actuator chamber 3 so that the magnet polarities interact to cause the valves in the valve assemblies to close in the event of an overflow.

However, as the device is capable of being opened by the user, for example to enable the user to clean the inside of the device, there is a danger that the user may put the float assembly back into the bottom section upside down—in which case the valve assemblies may not operate as intended in the event of an overflow.

Figure 14:
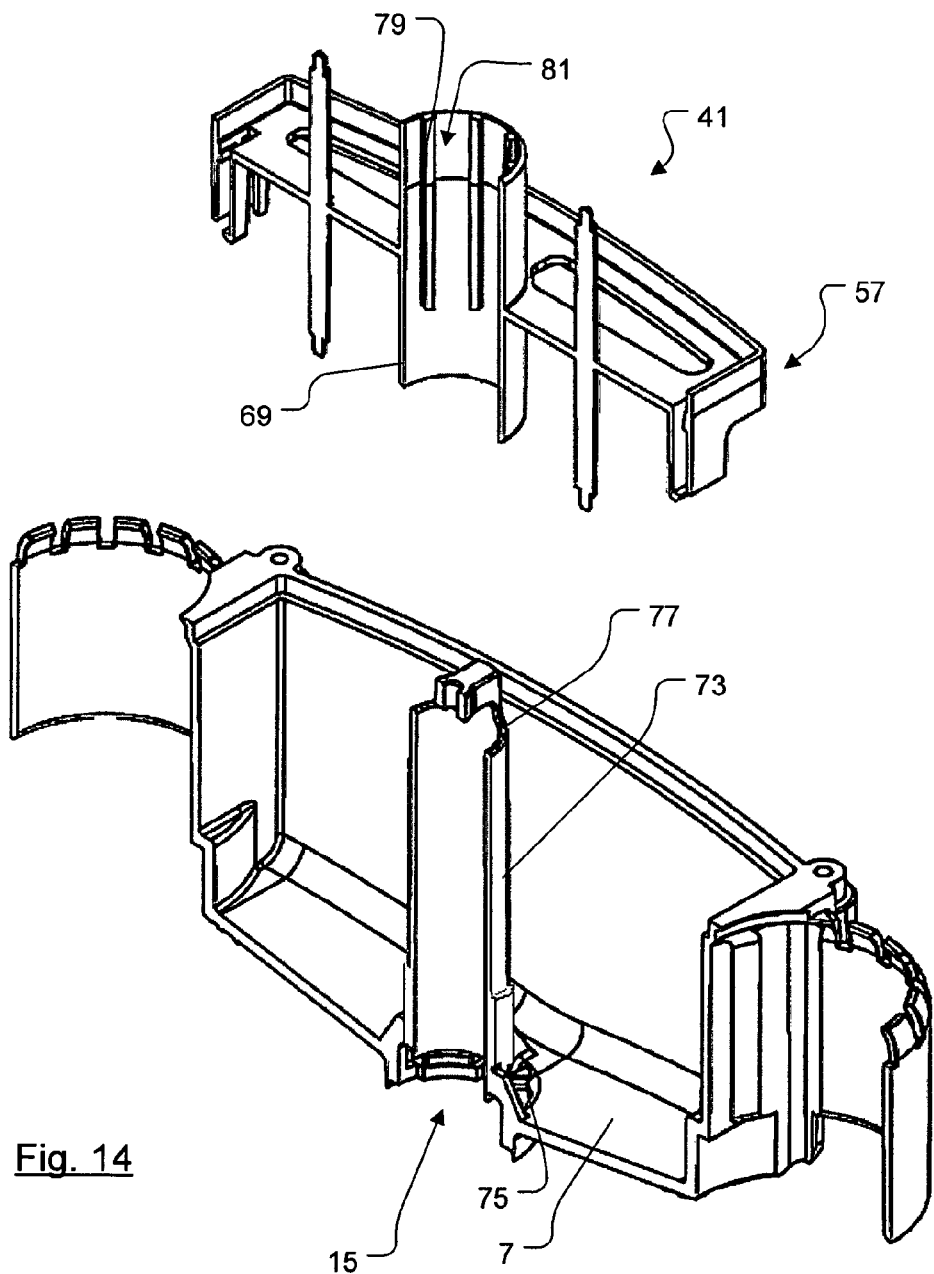
FIG. 14 is a modification of the arrangement shown in FIG. 13.

To address this problem a preferred embodiment of the present invention provides, as indicated in FIG. 14, a modified bottom section 7 where the exterior surface of the column 73 is thickened to form a shoulder 75 that interacts with the ribs 79 on the internal surface of the tubular portion 69 to prevent the float assembly from being inserted into the bottom section in any orientation other than that shown in FIG. 14.

In another arrangement not shown in the drawings, the shoulder may be replaced by a circumferential rib (which need not be continuous) that runs round the periphery of the column at a point spaced from the base thereof. Other functionally equivalent arrangements will be immediately apparent to persons skilled in the art.

In either case, the advantage of this embodiment of the present invention is that it is impossible for a user to insert the float assembly into the bottom section incorrectly.

Figure 15:
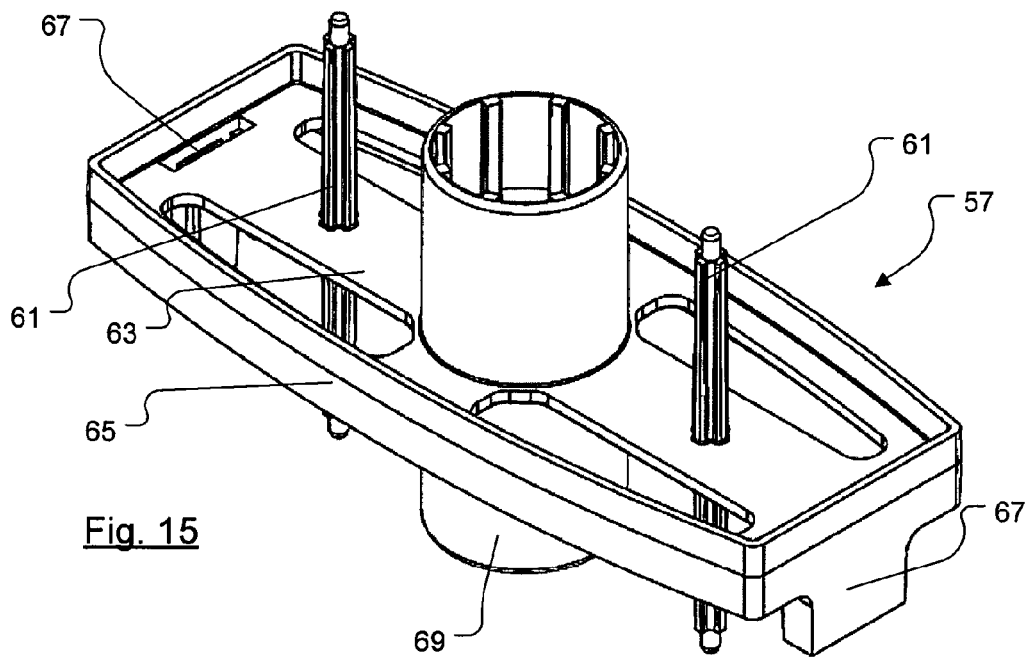
FIG. 15 is an isometric view of a float carrier that comprises part of the float assembly depicted in FIG. 11.

Referring now to FIG. 15, there is provided an isometric view of the float carrier 57 of the float assembly 41. As aforementioned, each end of the float carrier includes a magnet holder 67 that are each formed, at least partly, as an extension of a downwardly extending peripheral wall 65 of the carrier 57.

Figure 16:
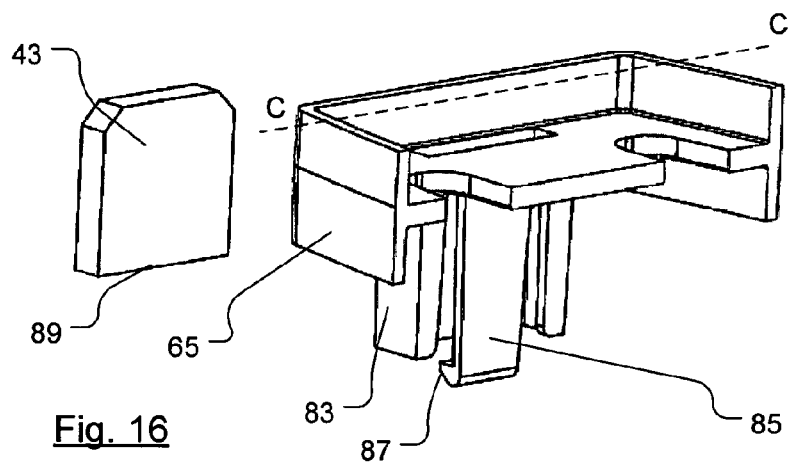
FIG. 16 is a view of part of the float carrier shown in FIG. 15 and a magnet.

Referring now to FIG. 16, which comprises a view of part of the carrier 57 shown in FIG. 15 together with a magnet 43, the holder 67 comprises an outer wall 83 that comprises an extension of the aforementioned downwardly depending peripheral wall 65 and an arm 85 that terminates with a hook 87 and is deformable towards the tubular portion 69 of the carrier 57.

Figure 17:
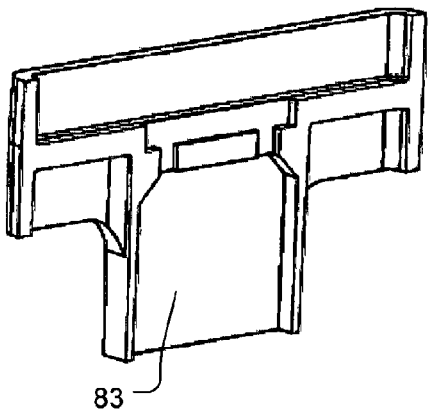
FIG. 17 is a sectional view of part of the float carrier along the line C-C of FIG. 16.

The magnet 43 includes a pair of chamfered corners, and as shown in FIG. 17 the outer wall 83 and arm (not shown) define a cavity that has a complementary shape to that of the magnet.

When the magnet 43, as orientated in FIG. 16, is inserted into the holder the magnet fills the entirety of the cavity shown in FIG. 17 and the hook 87 fits under a lower edge 89 of the magnet 43 to retain it in the holder 67. If, however, the magnet orientation should be reversed (i.e. so that the chamfered corners point towards the bottom of the page) then it is impossible to insert the magnet into the holder to such an extent that the hook 87 fits under the lower edge 89 of the magnet. As such the hook does not retain the magnet in place and the magnet will tend to fall out of the holder.

It is the case, therefore, that if a user should remove the magnets 43 from the carrier 57 for any reason then it will be impossible for them to put the magnets 43 back into the holders incorrectly, and as such it is impossible for the user to orientate the magnets in such a way that they no longer correctly interact with the magnets in the valve assemblies to operate the device in the event of an overflow.

In a particularly preferred embodiment of the present invention, as shown in FIG. 12, at least the lower foam pad 55 is formed of a material that is both buoyant and resistant to compression. The advantage of this arrangement is that once the magnets have been inserted into the holders 67 and the lower foam pad 55 has been installed on the carrier 57 the foam pad acts to resist movement of the arm 85 towards the tubular portion 69 and hence acts to resist disengagement of the "lock" provided by the engagement of the hook 87 with the lower edge 89 of the magnet 43.

Thus by virtue of this arrangement it is not only impossible for a user in insert a magnet into the holder in an incorrect orientation, but it is also difficult for the user to remove the magnets from the holders 67 in the first place.

In a preferred embodiment of the invention at least the lower foam pad 55 is of Plastazote®, a closed cell cross-linked polyethylene foam available from Zotefoams PLC of 675 Mitcham Road, Croydon CR9 3AL.

Figure 18:
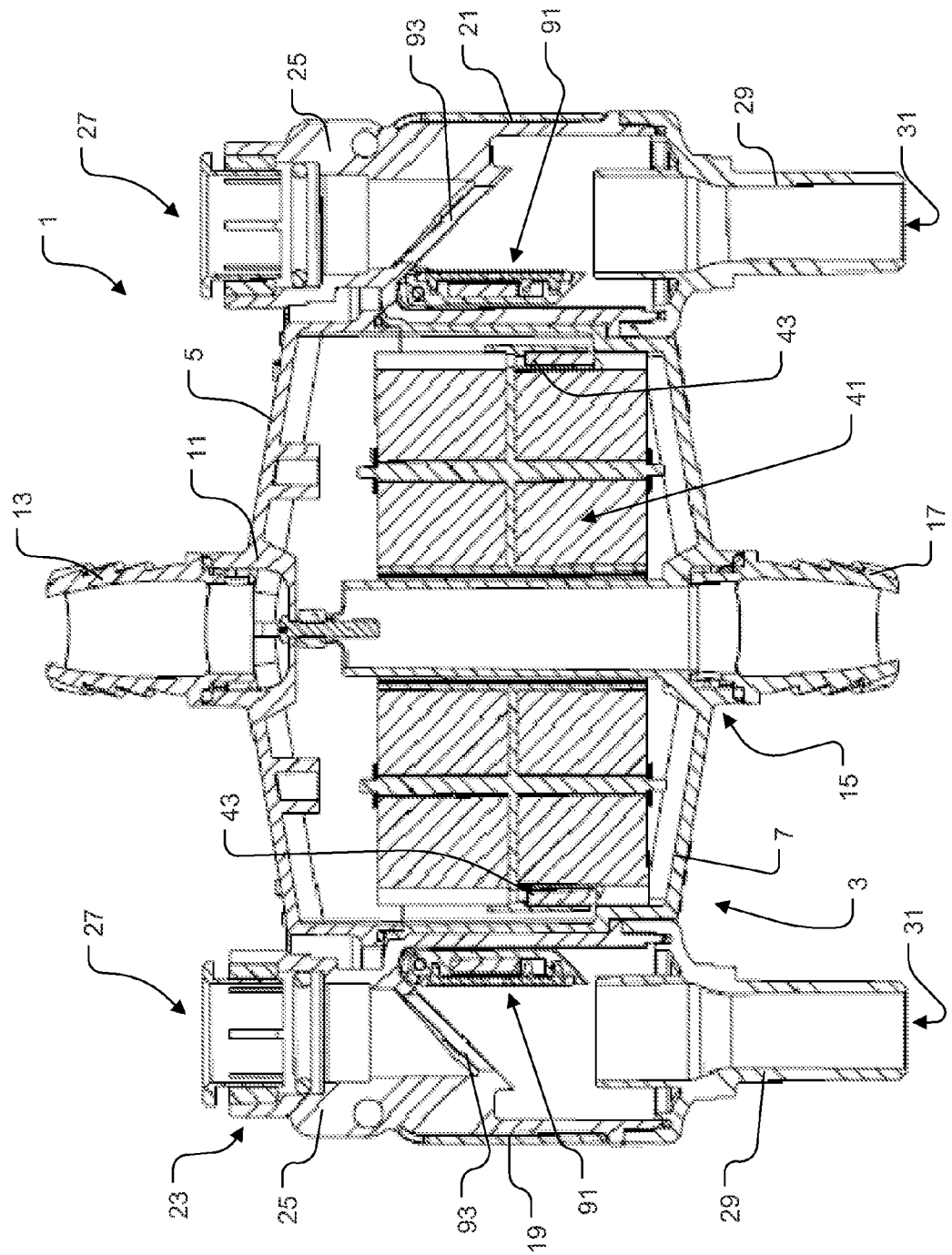
FIG. 18 is a cross-sectional view through the device along the line D-D of FIG. 6.

FIG. 18 is a cross-sectional view through the assembled device 1 along the line D-D of FIG. 6. As shown the top section 5 and bottom section 7 cooperate to define an internal cavity in which the float assembly 41 is received. The float assembly includes a pair of magnets at either end which cooperate with magnets carried by valves 91 of the valve assemblies 23.

The valve assemblies 23 are inserted into each of the wings 19, 21 of the bottom section 7, and the first component 25 of each assembly is internally structured to form a valve seat 93 against which the valve 91 can move to shut off or at least substantially restrict fluid flow through the valve assemblies 23 from the inlets 31 to the outlets 27 thereof.

As shown in FIG. 19*b* (which is a cross-sectional view through one of the valve assemblies) the valve 91 of each assembly is pivotally mounted in the valve assembly by means of a pivot pin 95 inserted into the valve assembly via a port 97 that is shown in FIG. 19*a*.

FIG. 20 is a front isometric exploded view, and FIG. 21 is a rear isometric exploded view, of a valve 91 for the valve assembly 23 of FIG. 19. As will now be explained with reference to FIGS. 20 and 21, the valve 91 is configured to reduce the incidence and/or effect of pressure perturbations on the fluid pressure measurements we take to determine whether the bleed rate of fluid past the valve when the valve is in its closed position is appropriate.

The valve 91 comprises a valve body 99, a valve soft face 101 (which may be formed of a resilient material to provide a good seal against the valve seat) and a soft face holder 103. The valve body 99 includes a generally square depression 105 that has a pair of chamfered corners so that the depression can accommodate a similarly shaped magnet 107 in only one orientation (i.e. with the chamfered magnet corners uppermost as shown).

The rear of the valve body 99 is formed with a through-hole 109 with which the pivot pin 95 engages to allow the assembled valve to pivot about the pin 95 to engage with the valve seat 93.

The soft face holder 103 includes four projections 111 that fit through corresponding holes 112 in the valve soft face 101 and can be fixed, for example by ultrasonically welding, to sandwich the magnet 107 between the soft face 101 and the valve body 99. The valve soft face also includes a fifth through-hole 113 that registers with a smaller through hole 115 formed in the soft face holder 103, and the underside of the soft face holder includes a projection 117 that fits within a generally half-moon shaped extension 119 of the depression 105 in the valve body 99.

The generally half-moon shaped extension 119 functions, in the first instance, to reduce the quantity of plastics used to manufacture the valve body 95 and by virtue of this to reduce the chance of warping that might otherwise occur if the half-moon depression were filled with plastics material. The half-moon extension 119 also receives the projection 117 on the underside of the soft face 101, which projection ensures that the soft face can only be installed in the valve in one orientation with respect to the valve body 99.

This last feature is important as the valve soft face 101 further comprises a channel 121 in the outer peripheral rim of the valve soft face that provides a means for fluid to bleed past the valve when the valve is abutted against the valve seat 93 in the closed valve position, and this bleed channel should be located towards that end of the seat 93 that is closest to the second component 29 of the valve assembly 23.

The advantage of this arrangement is that if any fluid should enter into the valve when the valve is under pressure and open, the fifth through-hole 113 and the smaller through-hole 115 that is registered with it provide a means for that fluid (in particular for any fluid filling the half moon extension 119) to quickly exit from the valve when the valve is closed thereby avoiding or at least reducing the pressure perturbations associated that can occur when fluids exits more slowly from within the valve. A channel is preferred to a hole through the valve as a channel is less likely to be blocked by any detritus carried by the fluid flowing through the valve assembly.

Referring now to FIGS. 22 to 25, the barbed coupling 13 comprises a first tubular portion 123, and a second tubular portion 125 set at an angle to the first portion. The second tubular portion carries a plurality of barbs on its external surface and is configured to be securely received within a flexible coupling (not shown) that couples the fluid flow control device to the overflow outlet of an appliance. The first and second tubular portions meet at a shoulder 127 that includes a plurality of tactile formations 129, in this instance a plurality of triangular projections, and an upstanding finger plate 131 to which pressure can be applied to move the barbed coupling with respect to the inlet or outlet of the actuator chamber 3.

As will be appreciated by persons skilled in the art, whilst flexible couplings are indeed flexible they cannot easily be bent through small radius turns. As such, if the second tubular portion were to be axially aligned with the first tubular portion, then in many circumstances it is likely that the flexible coupling would need to be bent through one or two relatively small radius turns. By canting the second tubular portion (with respect to the shoulder 127), the extent to which the flexible coupling needs to be bent can be reduced, and hence installation of the device can be eased. In the preferred embodiment the second tubular section 125 is canted by about 10 to 30 degrees towards the horizontal.

The first tubular portion could be secured in the inlet or outlet of the actuator chamber 3 by any of a number of different mechanisms (for example, by means of complementary screw-threads), but in the preferred arrangement the outer peripheral surface of the first tubular portion 123 includes a plurality of raised lands 133 (in this instance four lands) that function as cams and fit within complementary cam tracks 135 (FIG. 23) formed as indentations in the internal surface of the inlet 11 and outlet 15 of the actuator chamber 3.

The cam tracks 135 are generally L shaped, and a leading surface 137 of each of the lands is inclined to form a cam surface that causes the first tubular portion 123 to inwardly deform as the lands 133 ride over a triangular cam 139 provided within the cam track. The first tubular portion 123 outwardly expands once the lands have passed their respective cams and arrived at a rest position 139, thereby securing the first tubular portion in the inlet or outlet of the actuator chamber 3.

As will be appreciated by persons skilled in the art, by providing four lands and four corresponding cam tracks the second tubular portion 125 can be orientated at one of four predefined orientations with respect to the top portion 5 of the actuator chamber. In effect, the canted second tubular portion can be pointed in whichever one of four (in this instance) directions is most appropriate for the particular circumstances in which the device is to be installed. It will also be appreciated that the number of lands and corresponding cam tracks defines the number of positions in which the second portion can be orientated. For example if three lands and corresponding cam tracks are provided the second tubular portion can be orientated at one of three predefined orientations.

As shown in FIG. 22, each of the tactile formations 129 is aligned with a land 133, and the exterior of each of the outlet and inlet peripheral walls is provided with a plurality of tactile formations 141 that are each aligned with the corresponding rest position 139 within each of the cam tracks. The effect of this is that someone working to install a device that they cannot easily see can insert the first tubular portion 123 of the barbed coupling 13 into the inlet 11, for example, and then rotate the coupling 13 using the finger plate 131 until they can feel that the tactile formations 141 on the exterior of the inlet 11 are aligned with the tactile formations 129 on the shoulder 127. When the tactile formations are so aligned, the person installing the device knows that the lands are properly located in their respective rest positions 139.

As shown in FIGS. 22 and 25, the first tubular portion 123 includes a port 143 that functions to provide a second pathway from the interior of the actuator chamber 3 for fluid egress. In our previous patent, a so-called "gunge plug" was provided to ensure that fluid flowed out of the actuator chamber 3 at a slower rate than it entered, and by incorporating the port 143 into the first tubular portion the gunge plug can be dispensed with.

As aforementioned, the automatic fluid flow control device herein described operates in a similar same way as the device disclosed in our earlier United Kingdom patent, and reference should be made to that document for a more detailed description of the manner in which the device operates. In general, in the event of an overflow, fluid travels into the actuator chamber 3 via the inlet 11. Fluid leaves the chamber 3 (via port XXX) more slowly than it enters, and as the fluid level within the chamber 3 rises, the float assembly (which carries a magnet adjacent each valve assembly) rises and each magnet exerts a repulsive magnetic force on magnets mounted in a valve in each of the valve assemblies. The magnetic force causes the valves to move into the flow of fluid moving through each of the valve assemblies, whereupon the fluid drives the valves closed thereby interrupting the flow of fluid into the appliance.

To reset the device, the taps of the appliance are turned off, whereupon the fluid pressure either side of the valves equalises by virtue of a small bleed past the valves and the valves return to their original position under gravity and the influence of an attractive magnetic force from the falling float assembly as the fluid drains from the actuator chamber. Once the valves have returned, the taps (where the appliance is a bath or sink) can again be turned on to allow fluid to flow into the appliance once more.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims. For example, whilst the embodiments herein described all refer to a flow control device that has two valve assemblies, it will be apparent to persons skilled in the art that a single valve assembly, or more than two valve assemblies may instead be provided.

It should also be noted that whilst the accompanying claims set out particular combinations of features described herein, the scope of the present invention is not limited to the particular combinations hereafter claimed, but instead extends to encompass any combination of features herein disclosed irrespective of whether that combination of features has been claimed at this time. It should, in particular, be noted that the applicant may seek protection, for example in one or more divisional applications, for any embodiment of the invention disclosed herein in combination with one or more of the features claimed in the dependent claims appended hereto.

In summary, the applicant may wish to protect in combination or isolation, at least the following features of the preferred embodiments described and/or claimed herein:

A coupling for attachment to an inlet or an outlet of an automatic fluid flow control device, wherein the coupling comprises a first tubular portion configured to attach to the inlet or outlet of the automatic fluid flow device, and a second tubular portion set at an angle to said first portion.

A coupling that is removable from an automatic fluid flow control device.

A coupling that is rotatable with respect to a fluid flow control device.

An arrangement whereby a coupling and a fluid flow control device are provided with respective complementary parts of an engagement mechanism.

A coupling that is capable of being attached to a fluid flow control device in one of a plurality of predefined orientations.

A coupling having a first tubular portion that includes one or more bleed ports in a peripheral wall of the tubular portion so that, when inserted in the outlet of an automatic fluid flow device, two fluid pathways are formed for egress of fluid from the device.

A fluid flow control device having a port defined by a wall of the device, said wall having an external surface that is provided with a tactile formation, and a removable coupling for attachment to the port, the coupling having a tactile formation formed on the exterior of a peripheral wall thereof, the arrangement being such that the coupling is properly attached to the port of the fluid flow control device when the tactile formation on the exterior of the coupling wall is aligned with the tactile formation on the exterior of the device wall.

A fluid flow control device wherein those components of the device that are usually in contact with fluid in use are formed from a higher grade plastics material than those components which are not usually in contact with fluid in use.

A fluid flow control device wherein those components of the device in contact with pressurised fluid in use are formed from a higher grade of plastics material capable of withstanding at least 10 bar of fluid pressure, than those components which are in contact with fluid at atmospheric pressure in use.

A fluid flow control device wherein those components of the device which are only in contact with fluid in an overflow condition are formed from a lower grade plastics material.

A fluid flow control device comprising higher grade plastics material that is configured to withstand at least 10 bar fluid pressure and/or is of engineering grade plastics.

A fluid flow control device comprising, as lower grade plastics material, polypropylene (preferably glass reinforced polypropylene) and, as higher grade plastics material, Fortron (preferably glass reinforced Fortron)

A fluid flow control device comprising a valve assembly housing a valve and a separate actuator chamber housing an actuator, the actuator chamber and valve assembly being coupled together to form a single unitary device.

A valve assembly for coupling to an actuator chamber to provide a single unitary device, the coupled valve assembly and actuator chamber together comprising an automatic fluid flow control device.

An actuator chamber for coupling to a valve assembly to provide a single unitary device, the coupled valve assembly and actuator chamber together comprising an automatic fluid flow control device.

A fluid flow control device comprising a valve assembly and a separate actuator chamber, wherein the actuator chamber and valve assembly are configured so as to be coupled together to form a single unitary device, and the valve assembly and actuator chamber are provided with respective complementary components of a two-part engagement mechanism.

The engagement mechanism may be configured to provide a snap-fit coupling of the valve assembly and actuator chamber.

The mechanism may comprise one or more fingers provided on the actuator chamber, said one or more fingers being configured to snap behind a peripheral wall provided on the valve assembly.

The one or more fingers and the wall may be configured to resist decoupling of the valve assembly and the actuator chamber.

A valve assembly for a fluid flow control device, the valve assembly comprising hollow first and second components that are capable of being coupled together to form an internal void within which a valve is provided, the first and second components each comprising a peripheral wall that is provided with an alignment marker on its exterior, wherein coupling of said first component to said second component to a correct torque setting is accomplished when the alignment marker on said second component is aligned with the alignment marker on said first component.

A fluid flow control device comprising a two-part valve assembly defining an internal void within which a valve is provided, and a separate actuator chamber housing an actuator, wherein the actuator chamber and valve assembly are coupled together to form a single unitary device, and the actuator chamber and the valve assembly include complementary formations that cooperate to resist disassembly of the two-part valve assembly whilst the valve assembly and actuator chamber are coupled together.

A fluid flow control device having complementary cooperating formations that comprise a projection on the exterior of the valve assembly that is receivable within a complementary groove in an external wall of the actuator chamber, or a projection on the exterior of the actuator chamber that is receivable within a complementary groove in an external wall of the valve assembly.

A fluid flow control device comprising a two-part valve assembly defining an internal void within which a valve is provided, and a separate actuator chamber housing an actuator, wherein the actuator chamber and valve assembly are coupled together to form a single unitary device, and the actuator chamber and the valve assembly include complementary interengaging formations that cooperate to align the valve assembly and actuator chamber and the valve with the actuator when the valve assembly and actuator chamber are coupled together.

A fluid flow control device wherein interengaging formations function to resist disassembly of the two-part valve assembly and to align the valve assembly and actuator chamber.

A fluid flow control device comprising first and second portions that are configured to be coupled one to the other by a plurality of fixings to define an internal void, wherein a peripheral wall of one of said first or second portions is curved between two adjacent fixings towards a peripheral wall (which may not be curved) of the other of said first or second portions so that on coupling the first and second portions together at least a portion of said curved peripheral wall is placed in compression.

A fluid flow control device wherein a portion with a curved peripheral wall is of a plastics material.

A fluid flow control device wherein both said first and said second portions are of plastics material.

A fluid flow control device comprising: an actuator guide, and an actuator movable on said guide, wherein the actuator and the guide comprise respective surfaces that face one another and move over each other as the actuator moves relative to the guide, one of said surfaces comprising one or more surface formations with a surface area less than that of the surface on which said formations are provided.

A fluid flow control device comprising: an actuator guide, and an actuator mountable on said guide for movement with respect thereto, wherein the actuator and are configured so that the actuator can only be mounted on the guide in one orientation.

A fluid flow control device as described or claimed herein, wherein the device is operable in the event of an overflow, and without requiring a supply of electricity, to automatically shut off or at least substantially reduce fluid flow through the device.

A fluid flow control device comprising an actuator that includes a holder which defines a pocket in which a magnet may be secured, the holder being configured so that the magnet may only be secured in the pocket in an orientation where the magnet is capable of magnetically interacting with a valve to close the valve.

A fluid flow control device comprising an actuator that includes a holder for receiving a magnet, means moveable between a first position where it retains a magnet in the holder and a second position where the magnet can be withdrawn from the holder, and means for restraining movement of said movement means to said second position.

A fluid flow control device comprising restraining means in the form of a float.

A valve assembly comprising a valve that is moveable from an open position to a closed position where the valve bears against a valve seat to shut off or at least substantially restrict fluid flow through the valve assembly, wherein fluid under pressure can seep into the valve when the valve is in the open position and the valve comprises means operable to facilitate the egress of any fluid that has seeped into the valve in the event that the valve should move from said open position to said closed position.

A valve assembly comprising a valve seat and a valve that is moveable from an open position to a closed position where the valve bears against the valve seat to shut off or at least substantially restrict fluid flow through the valve assembly, the valve including means for permitting fluid to bleed past the valve when the valve is in said closed position.

A valve assembly comprising permitting means in the form of a channel formed in a face of said valve that bears against the seat.

A valve assembly that comprises multiple components, means being provided to ensure that those components can only be assembled in one orientation.

The invention claimed is:

1. An automatic fluid flow control device for a fluid supply, the device comprising: an actuator that carries or includes a magnet, the actuator being movable within a housing from a first position corresponding to a normal fluid supply to a second position corresponding to a fluid oversupply, wherein the actuator is removable from the housing to enable the device to be cleaned, and the housing and actuator are configured so that the actuator can only be accommodated in the housing in an orientation that enables said magnet to exert a magnetic force to close a valve in said fluid supply as said actuator moves from said first to said second position.

2. A device according to claim 1, comprising: an actuator guide, said actuator being mounted on said actuator guide for movement with respect thereto between said first and second positions, wherein the actuator and actuator guide are configured so that the actuator can only be mounted on the actuator guide in one orientation for reassembly of the device.

3. A device according to claim 1, comprising an actuator guide, wherein the actuator and the actuator guide comprise respective surfaces that face one another and move over each other as the actuator moves relative to the actuator guide, one of said surfaces comprising one or more surface formations extending towards the other surface, said surface formations having a surface area adjacent said other surface that is less than the surface area of the surface from which said formations extend.

4. A device according to claim 1, wherein said actuator includes a holder that defines a pocket in which a magnet may be secured, said holder being configured so that the magnet may only be secured in the pocket in an orientation where the magnet is capable of magnetically interacting with the valve to close the valve.

5. A device according to claim 1, wherein said housing defines an actuator chamber in which said actuator is received, said valve is housed in a valve assembly separate from said actuator chamber, and the actuator chamber and valve assembly are coupled together to form a single unitary device.

6. A device according to claim 5, wherein the valve assembly and actuator chamber are provided with respective complementary components of a two-part engagement mechanism, said mechanism being configured to provide a snap-fit coupling of the valve assembly and actuator chamber.

7. A device according to claim 5 wherein the actuator chamber and the valve assembly include complementary interengaging formations that cooperate to align the valve assembly and actuator chamber and the valve with the actuator when the valve assembly and the actuator chamber are coupled together.

8. A device according to claim 5, wherein the valve bears against a valve seat to shut off or at least substantially restrict fluid flow through the valve assembly, wherein fluid under pressure can seep into the valve when the valve is in the open position and the valve comprises means operable to facilitate the egress of any fluid that has seeped into the valve in the event that the valve should move from said open position towards said closed position.

9. A device according to claim 8, wherein the valve includes means for permitting fluid to bleed past the valve when the valve is in said closed position.

10. A device according to claim 8, wherein the valve comprises multiple components and means are provided to ensure that those components can only be assembled in one orientation.

11. A device according to claim 1, wherein said housing comprises first and second portions that are configured to be coupled one to the other by a plurality of fixings to define an internal void, wherein a peripheral wall of one of said first or second portions is curved between two adjacent fixings towards a peripheral wall of the other of said first or second portions so that on coupling the first and second portions together at least a portion of said curved peripheral wall is placed in compression.

12. A device according to claim 1, wherein said housing includes an inlet port and an outlet port, and the device further comprises a coupling for attachment to the inlet port or the outlet port of the automatic fluid flow control device, wherein the coupling comprises a first tubular portion configured to attach to the inlet port or outlet port of the automatic fluid flow device, and a second tubular portion set at an angle to said first portion.

13. A device according to claim 12, wherein said inlet port and outlet port in said housing are defined by walls of the housing, each said wall having an external surface that is provided with a tactile formation, said coupling having a tactile formation formed on the exterior of a peripheral wall thereof, the arrangement being such that the coupling is properly attached to the inlet port or the outlet port of the housing when the tactile formation on the exterior of the coupling wall is aligned with the tactile formation on the external surface of the housing wall.

14. A device according to claim 1, wherein components of the device that are usually in contact with fluid in use are formed from a higher grade plastics material than components which are not usually in contact with fluid in use.

15. A device according to claim 1, wherein the device is operable in the event of an overflow, and without requiring a supply of electricity, to automatically shut off or at least substantially reduce fluid flow through the device.

16. An automatic fluid flow control device, comprising: an actuator chamber forming a housing for an actuator that is moveable in response to an overflow condition from a first position to a second position, the actuator carrying or including a magnet; a valve assembly having a valve moveable towards a valve seat to close the valve, the valve carrying or including a magnet; wherein: the valve assembly and actuator chamber comprise discrete components that have been secured one to the other to form the automatic fluid flow control device; the actuator chamber can be opened and the actuator removed to permit the actuator chamber to be cleaned; and the actuator chamber and actuator are configured so that the actuator can only be accommodated in the housing in an orientation that enables the actuator magnet to exert a magnetic force on the magnet of said valve to close the valve as said actuator moves from said first to said second position.

17. A device according to claim 16 wherein the magnet of said actuator attracts the magnet of said valve when the actuator is in the first position to hold the valve open and repels the magnet of said valve as the actuator moves towards the second position to drive said valve towards a closed position.

18. An automatic fluid flow control device, comprising:
(i) an actuator chamber forming a housing for an actuator that is moveable in response to an overflow condition from a first position to a second position, the actuator carrying or including a magnet; and the housing including an inlet and an outlet;

(ii) a valve assembly having a valve moveable towards a valve seat to close the valve, the valve carrying or including a magnet; and (iii) a coupling for attachment to the inlet or the outlet of the automatic fluid flow control device, wherein the coupling comprises a first tubular portion configured to attach to the inlet or outlet of the automatic fluid flow device, and a second tubular portion set at an angle to said first portion, said coupling having a tactile formation formed on the exterior of a peripheral wall thereof;

wherein:

the valve assembly and actuator chamber comprise discrete components that have been secured one to the other to form the automatic fluid flow control device;

the actuator chamber can be opened and the actuator removed to permit the actuator chamber to be cleaned;

the actuator chamber and actuator are configured so that the actuator can only be accommodated in the housing in an orientation that enables the actuator magnet to exert a magnetic force on the magnet of said valve to close the valve as said actuator moves from said first to said second position;

said inlet and outlet in said housing are defined by walls of the housing, each said wall having an external surface that is provided with a tactile formation, and the coupling is properly attached to the inlet or outlet of the housing when the tactile formation on the exterior of the coupling wall is aligned with the tactile formation on the external surface of the housing wall.

\* \* \* \* \*